(12) United States Patent
Kuroki et al.

(10) Patent No.: US 10,070,114 B2
(45) Date of Patent: Sep. 4, 2018

(54) SPLITTING LIGHT TO GENERATE PARALLAX IMAGE

(71) Applicant: Sony Corporation, Tokyo (JP)

(72) Inventors: Yoshihiko Kuroki, Kanagawa (JP); Eiji Otani, Kanagawa (JP)

(73) Assignee: Sony Corporation, Tokyo (JP)

( * ) Notice: Subject to any disclaimer, the term of this patent is extended or adjusted under 35 U.S.C. 154(b) by 446 days.

(21) Appl. No.: 14/346,387

(22) PCT Filed: Oct. 1, 2012

(86) PCT No.: PCT/JP2012/006266
§ 371 (c)(1),
(2) Date: Mar. 21, 2014

(87) PCT Pub. No.: WO2013/051228
PCT Pub. Date: Apr. 11, 2013

(65) Prior Publication Data
US 2014/0225993 A1 Aug. 14, 2014

(30) Foreign Application Priority Data
Oct. 3, 2011 (JP) ................................ 2011-218870

(51) Int. Cl.
H04N 13/00 (2018.01)
H04N 11/00 (2006.01)
H04N 13/02 (2006.01)

(52) U.S. Cl.
CPC ....... H04N 13/0011 (2013.01); H04N 13/025 (2013.01); H04N 13/0239 (2013.01);
(Continued)

(58) Field of Classification Search
CPC ........... H04N 13/0239; H04N 13/0296; H04N 5/2254; H04N 5/23212; H04N 13/0025
(Continued)

(56) References Cited

U.S. PATENT DOCUMENTS 4,734,756 A 3/1988 Butterfield et al.
4,957,361 A 9/1990 Shaw
(Continued)

FOREIGN PATENT DOCUMENTS

EP 2 200 271 A1 6/2010
EP 2200271 A1 6/2010
(Continued)

OTHER PUBLICATIONS

Japanese Office Action dated Jul. 7, 2015 in patent application No. 2011218870.
(Continued)

Primary Examiner — Thai Tran
Assistant Examiner — Syed Hasan
(74) Attorney, Agent, or Firm — Chip Law Group

(57) ABSTRACT

Methods and apparatus for splitting light received from at least one subject into at least first and second components of light, converting the first component of light into a first electrical signal representing a base image of the at least one subject, dispersing the second component of light into at least a right component of light and a left component of light; converting the right component of light into a second electrical signal representing a right detection image at a first angle; and converting the left component of light into a third electrical signal representing a left detection image at a second angle different from the first angle. Additionally, the right detection image may be used to transform the base image into a right parallax image, and the left detection image may be used to transform the base image into a left parallax image.

13 Claims, 15 Drawing Sheets

(52) U.S. Cl.
CPC ..... *H04N 13/0242* (2013.01); *H04N 13/0055* (2013.01); *H04N 2213/007* (2013.01)

(58) Field of Classification Search
USPC ...................................... 348/47, 94, 335, 43
See application file for complete search history.

(56) References Cited

U.S. PATENT DOCUMENTS

| | | | |
|---|---|---|---|
| 7,405,877 | B1 | 7/2008 | Schechterman |
| 2003/0007089 | A1* | 1/2003 | Rosiene ............... H04N 19/635 348/384.1 |
| 2007/0188601 | A1* | 8/2007 | Rohaly .............. H04N 13/0217 348/47 |
| 2011/0198322 | A1* | 8/2011 | Manens ............... B23K 26/032 219/121.72 |
| 2012/0081513 | A1* | 4/2012 | Yamada ............. H04N 13/0029 348/43 |
| 2014/0002667 | A1* | 1/2014 | Cheben .............. G01N 21/3518 348/164 |

FOREIGN PATENT DOCUMENTS

| | | |
|---|---|---|
| JP | 58117791 A | 7/1983 |
| JP | 2001-016611 A | 1/2001 |
| JP | 2003526829 A | 9/2003 |
| JP | 2005-210217 A | 8/2005 |
| JP | 2005-244916 A | 9/2005 |
| JP | 2008-187440 A | 8/2008 |
| JP | 2009527007 A | 7/2009 |
| JP | 2010-081580 A | 4/2010 |
| JP | 2010-230879 A | 10/2010 |
| JP | 2011-160299 A | 8/2011 |
| WO | 00/13142 A1 | 3/2000 |
| WO | WO 00/13142 A1 | 3/2000 |
| WO | 2011118077 A1 | 9/2011 |
| WO | 2011118089 A1 | 9/2011 |

OTHER PUBLICATIONS

Chinese Office Action dated Aug. 5, 2015 in patent application No. 201280047291.9.
Office Action for JP Patent Application No. 2016-073809, dated Mar. 14, 2017, 05 pages.
Office Action for EP Patent Application No. 12781475.4, dated Apr. 6, 2017, 15 pages.
Decision of Refuse for EP Patent Application No. 12781475.4, dated Feb. 20, 2018, 10 pages.

* cited by examiner

[Fig. 1]
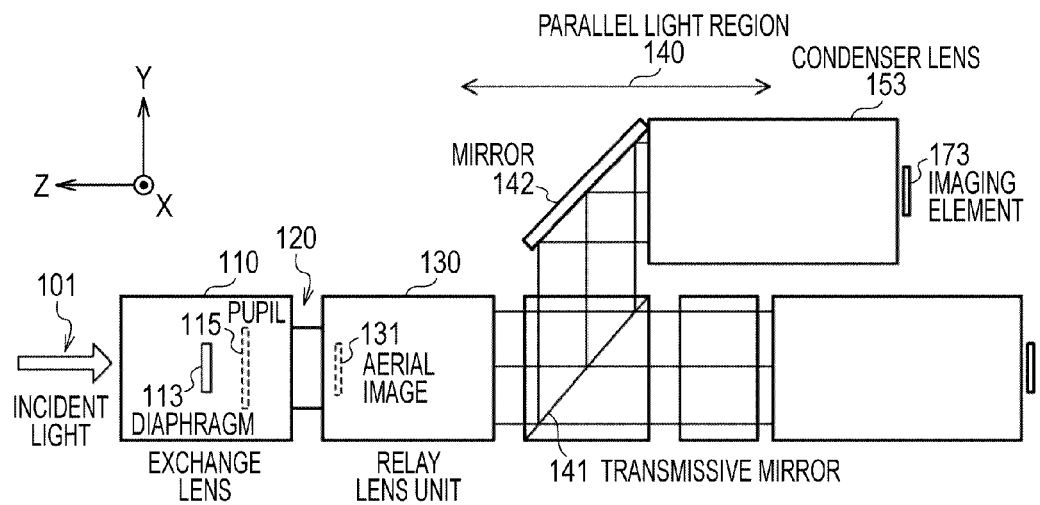
a
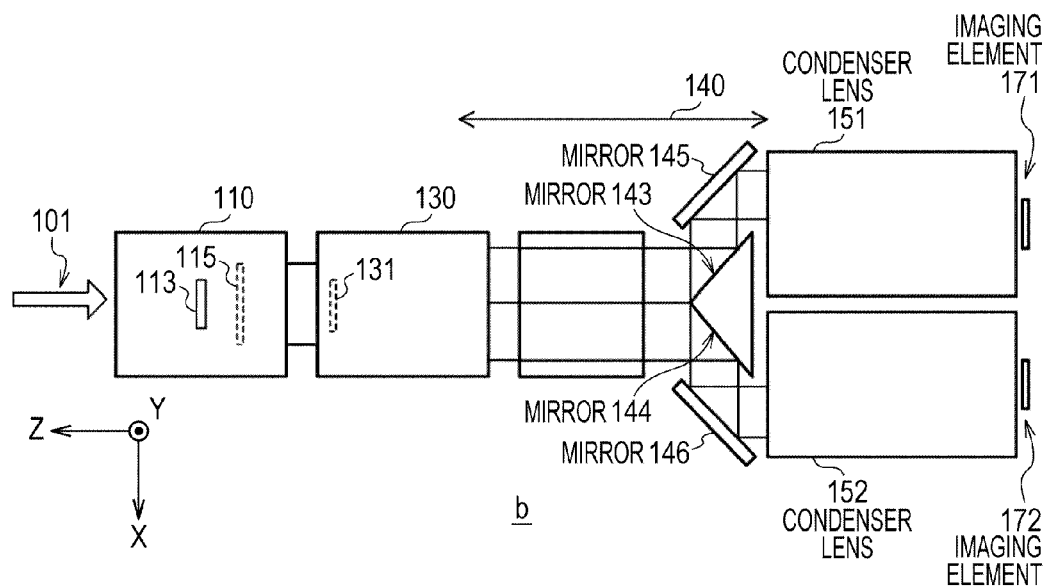
b

[Fig. 2]
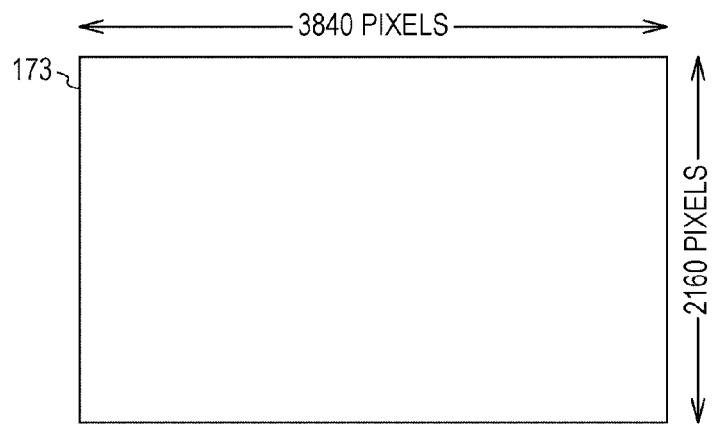
a
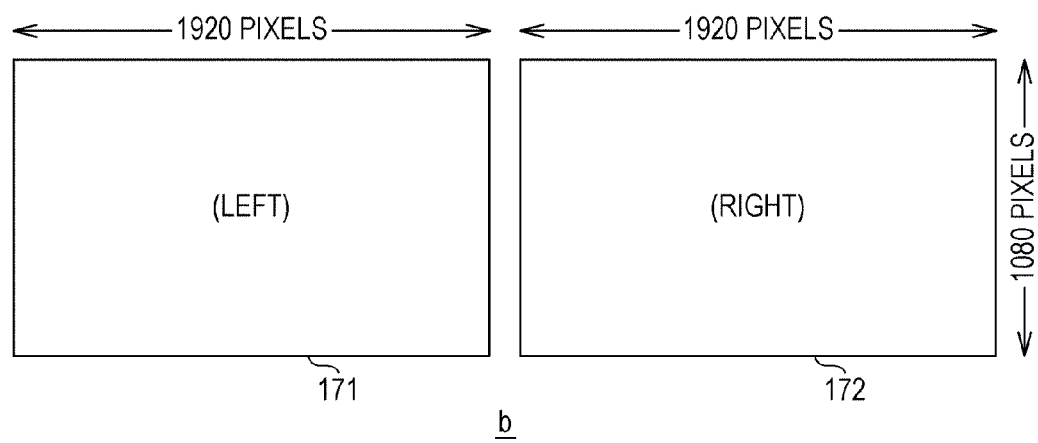
b

[Fig. 3]
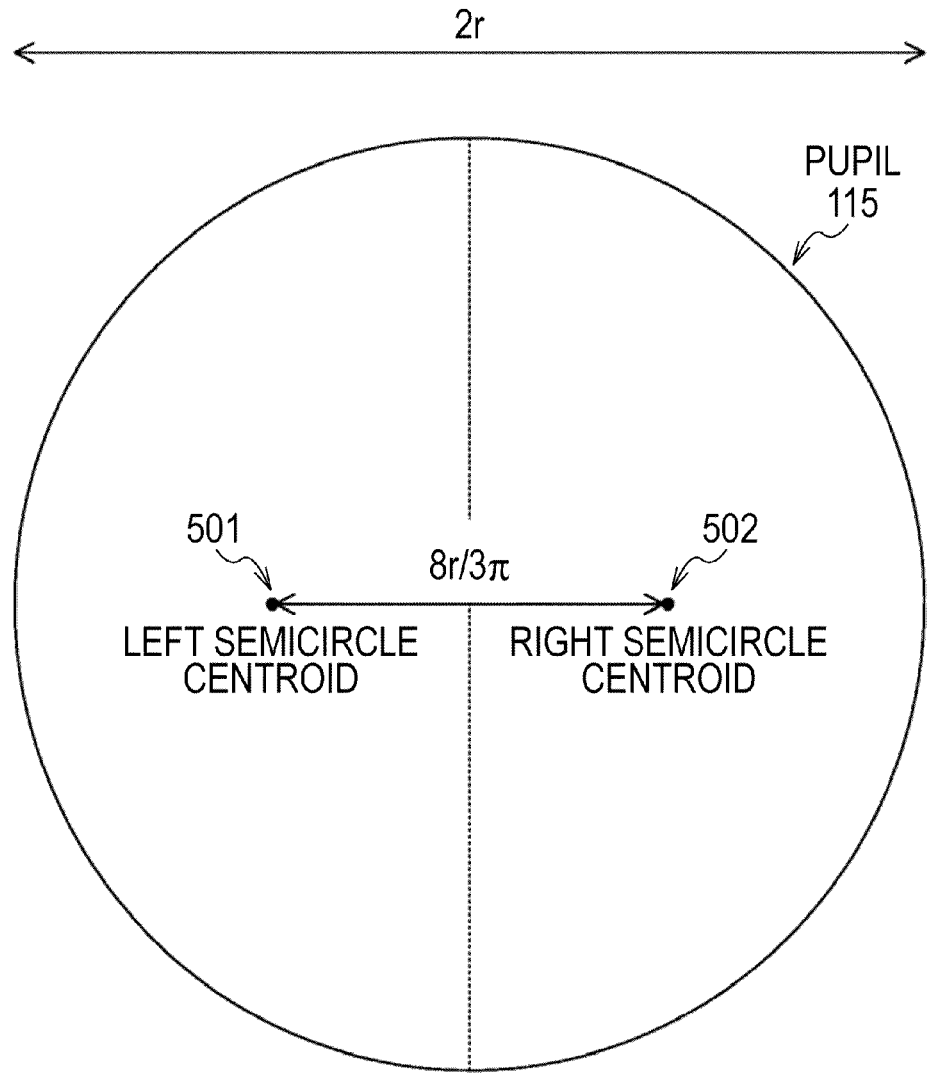
[Fig. 4]
| LENS | LENS STANDARD | | | CONDITION | | CENTROID-TO-CENTROID DISTANCE (THEORETICAL VALUE) [mm] | BASE LINE LENGTH (EXPERIMENTAL VALUE) [mm] |
|---|---|---|---|---|---|---|---|
| | OPEN F VALUE | FOCAL DISTANCE [mm] | ZOOM RATIO [TIMES] | FOCAL DISTANCE [mm] | PHOTOGRAPHING DISTANCE [m] | | |
| #A | 1.8 | 10 TO 100 | 10 | 100 | 6.5 | 23.6 | 20.0 |
| #B | 2.8 | 13.5 TO 570 | 42 | 100 | 6.5 | 15.2 | 12.0 |

[Fig. 5]
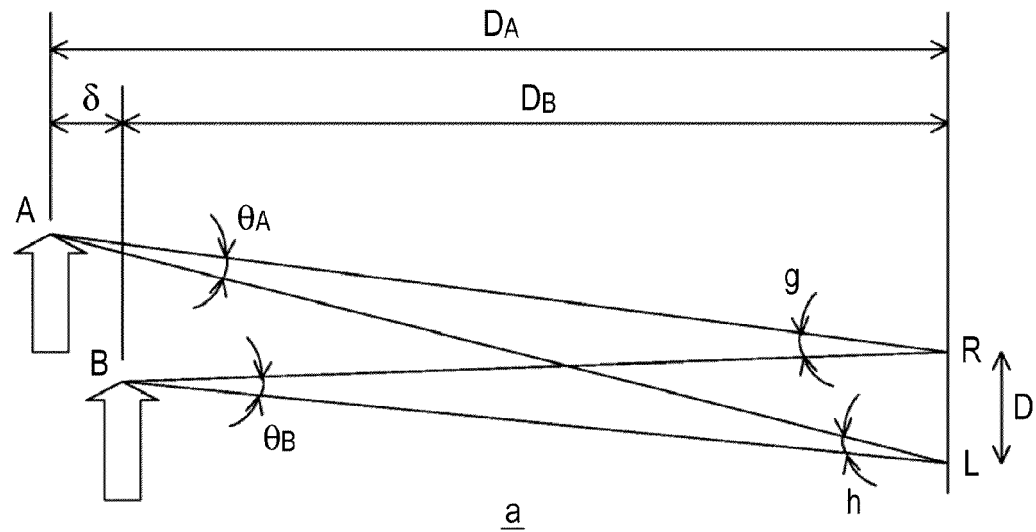
a
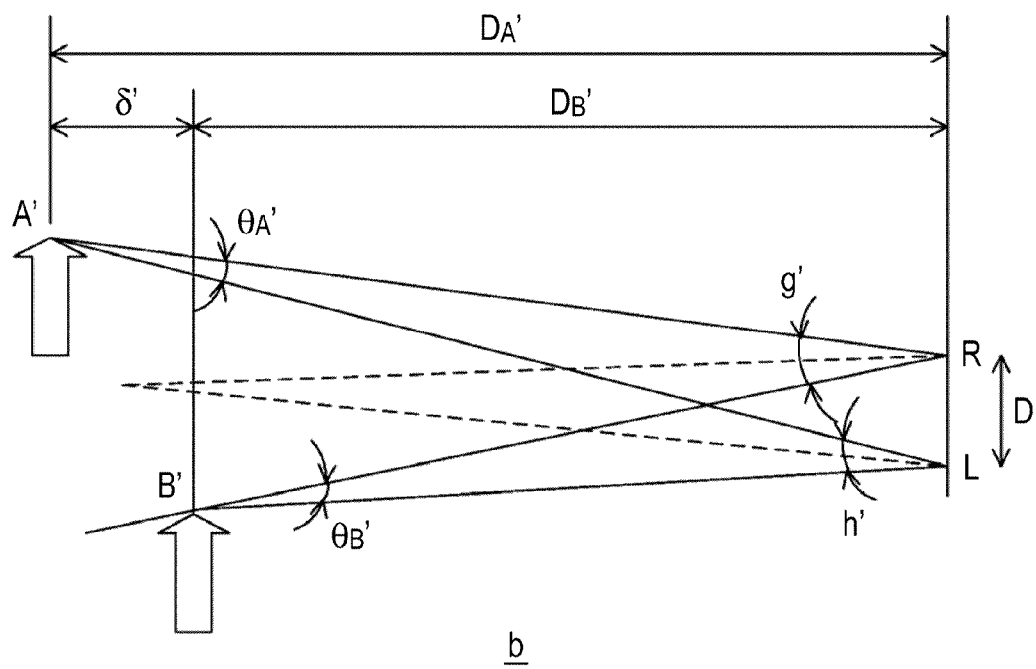
b

[Fig. 6]
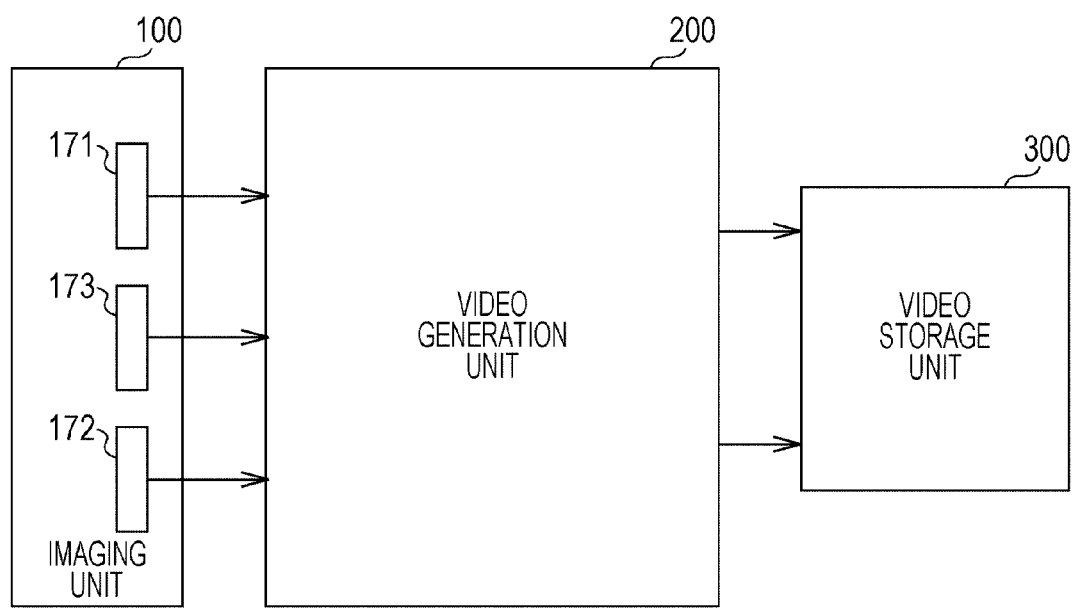

[Fig. 7]
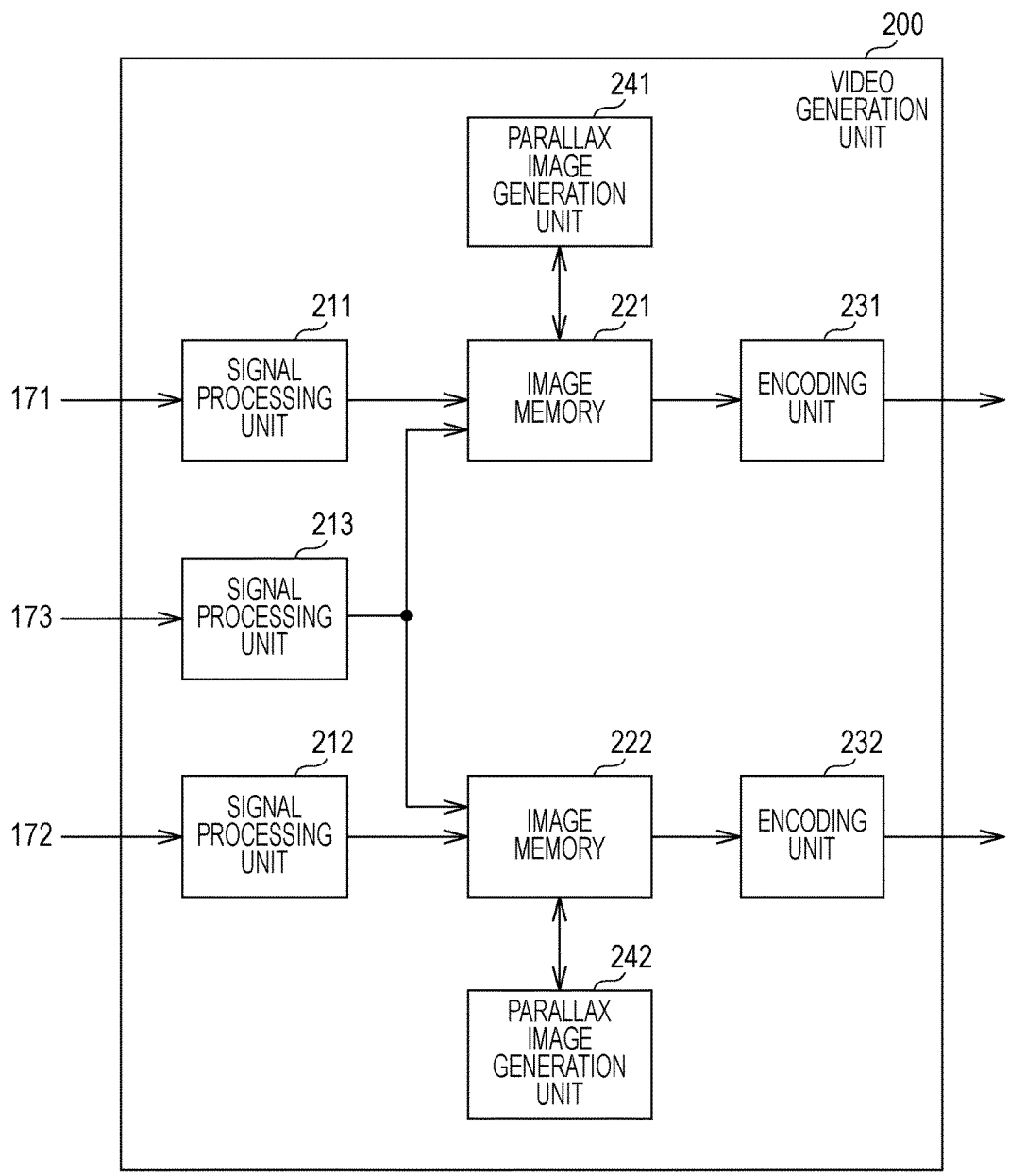

[Fig. 8]
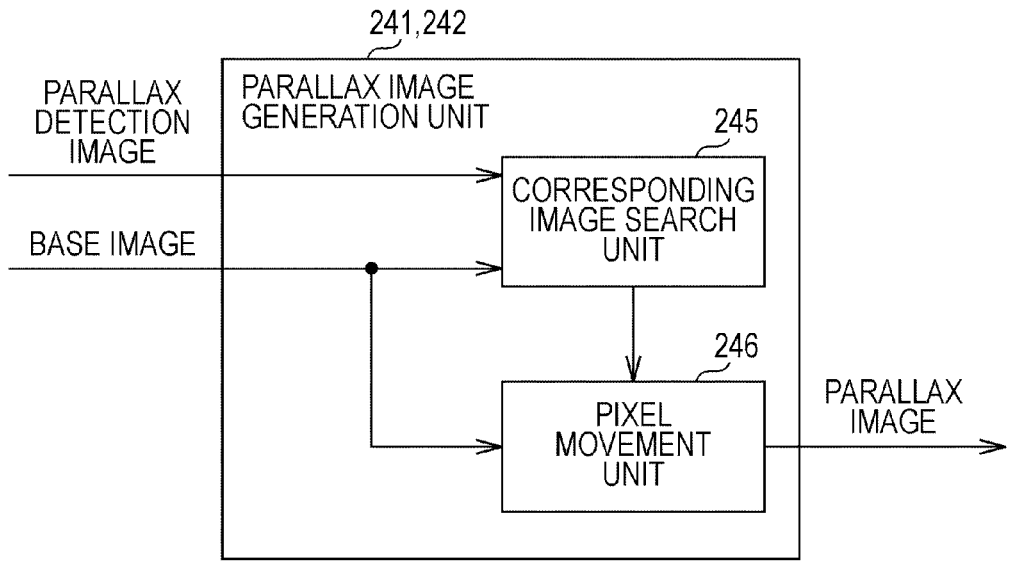
[Fig. 9]
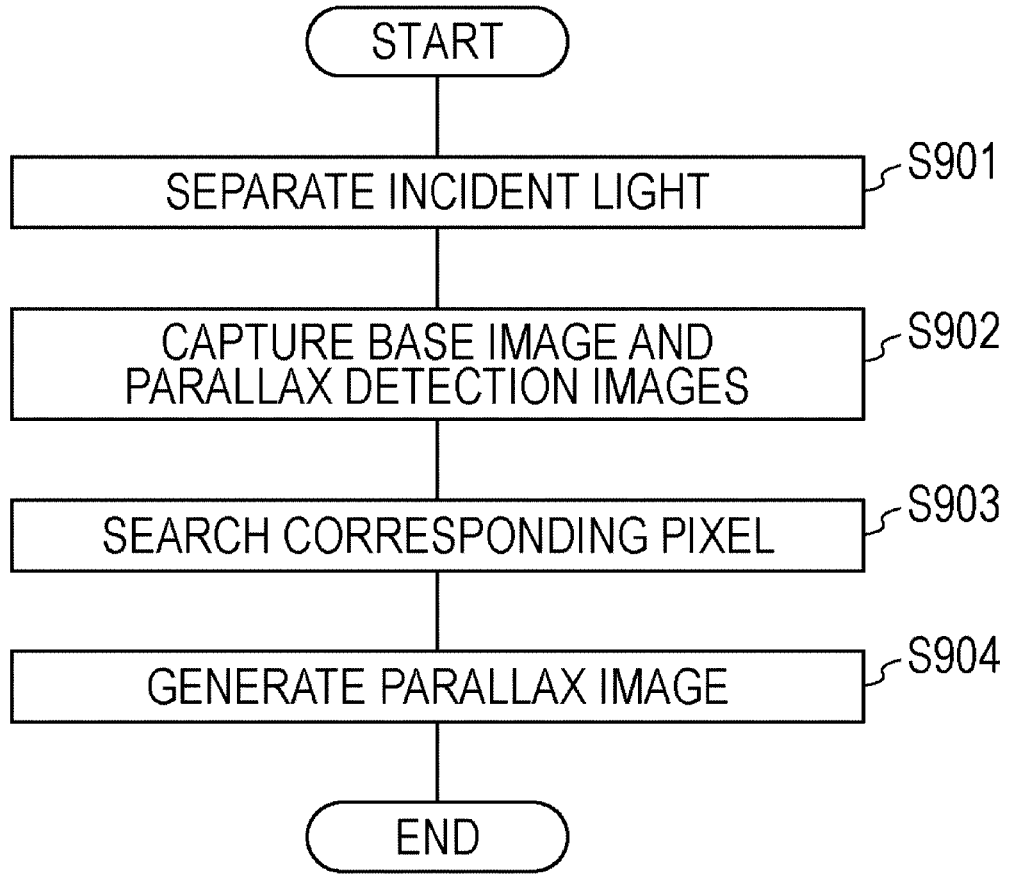

[Fig. 10]
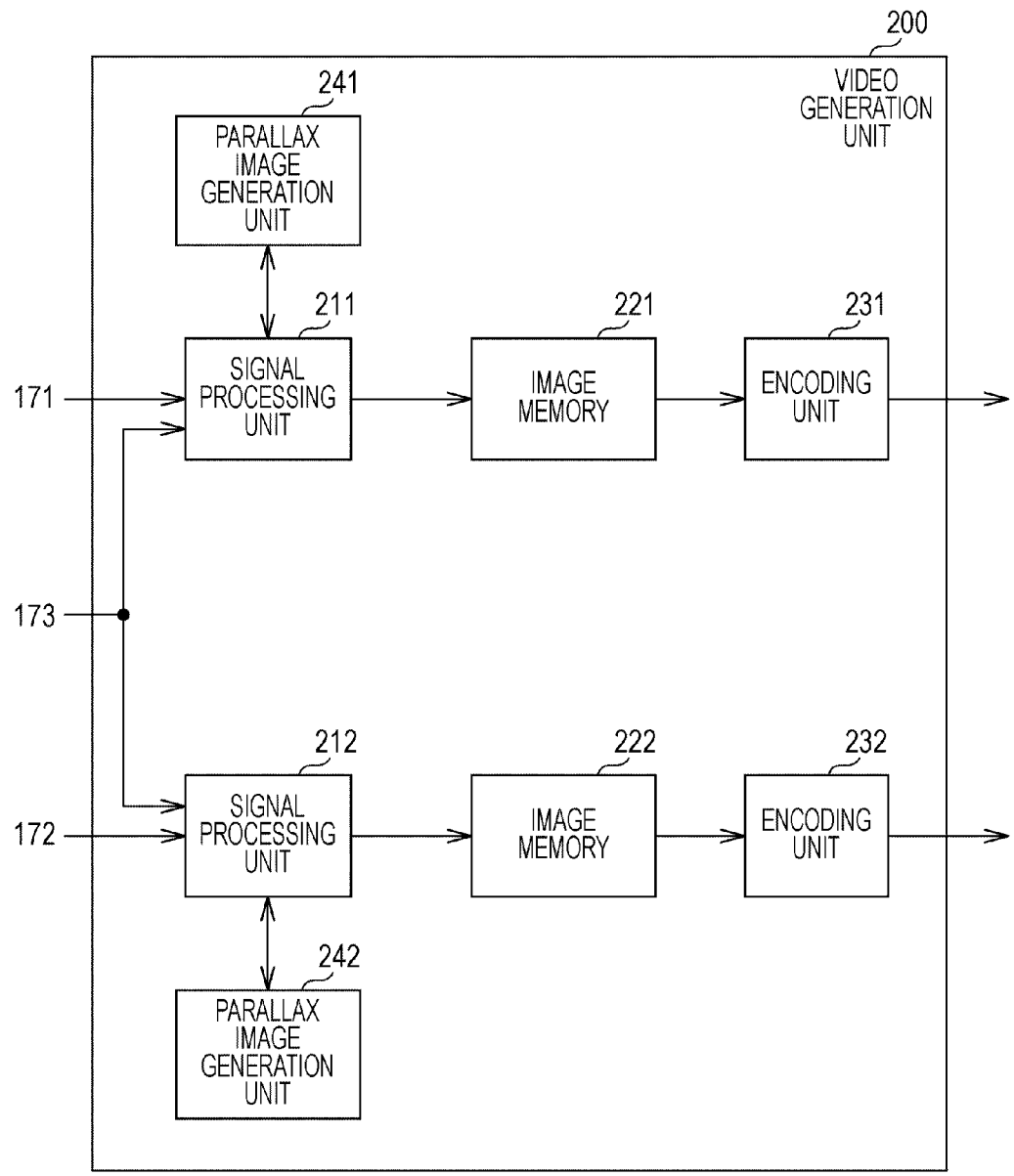

[Fig. 11]
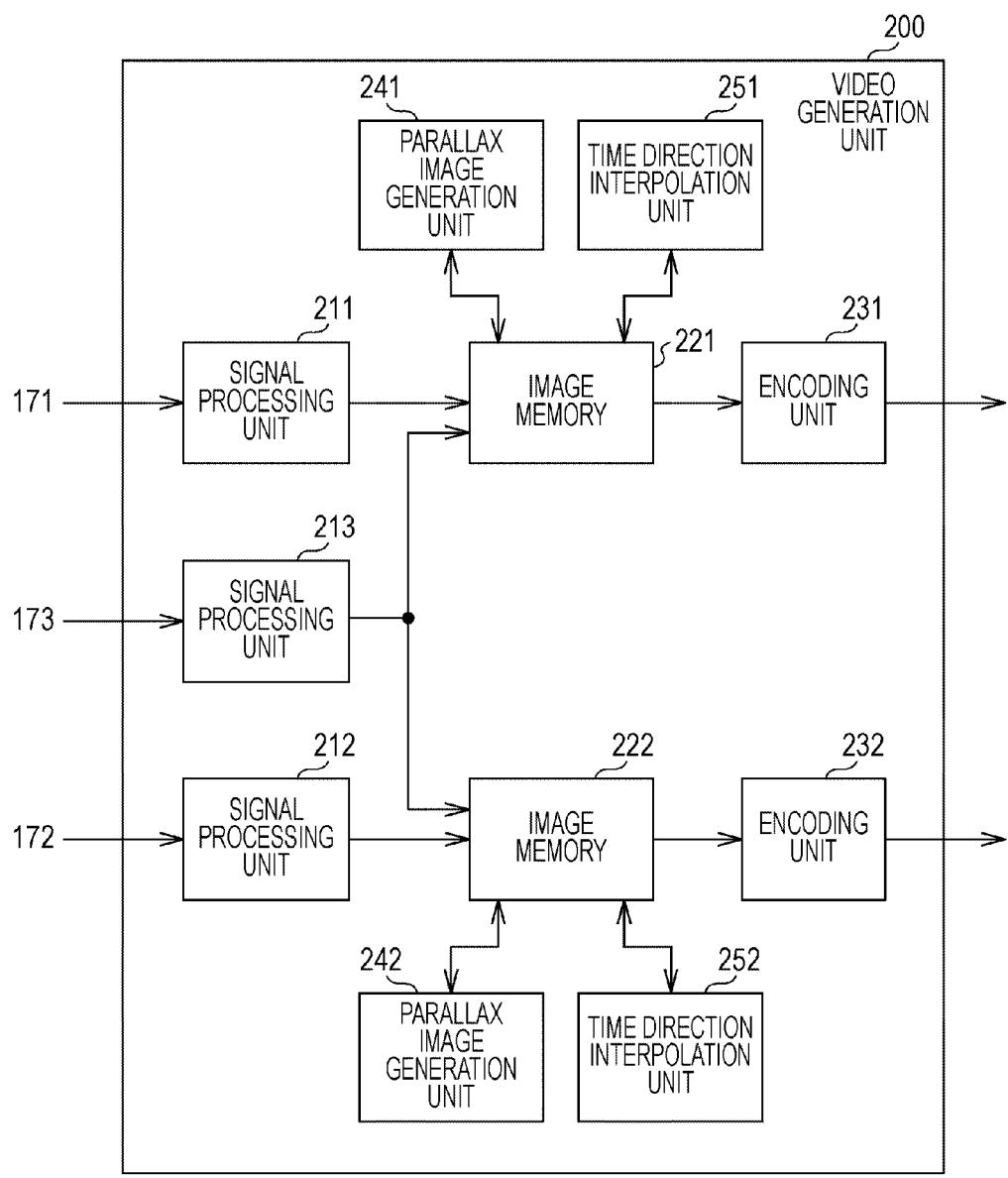

[Fig. 12]
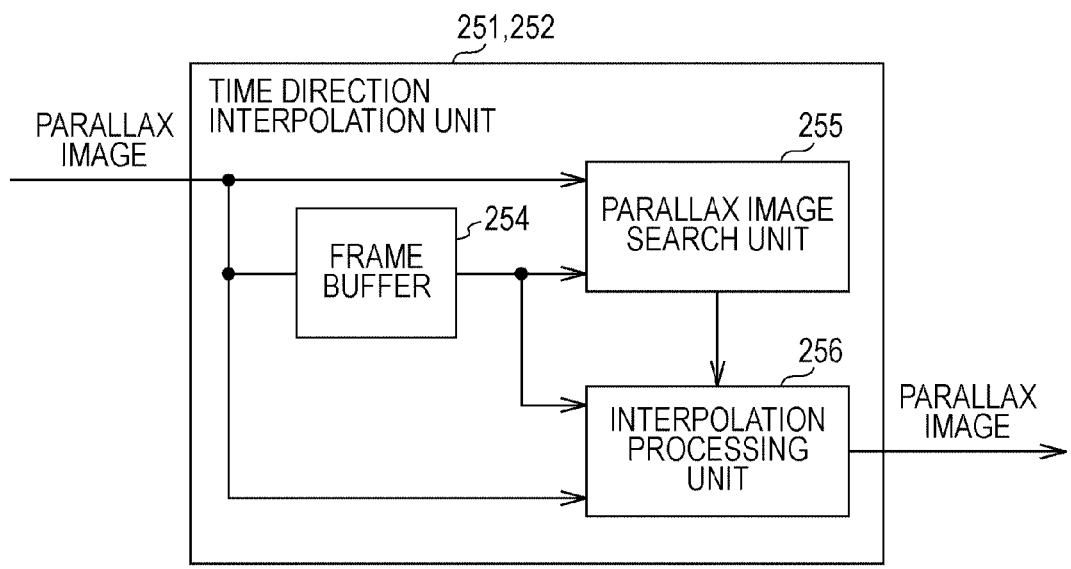

[Fig. 13]
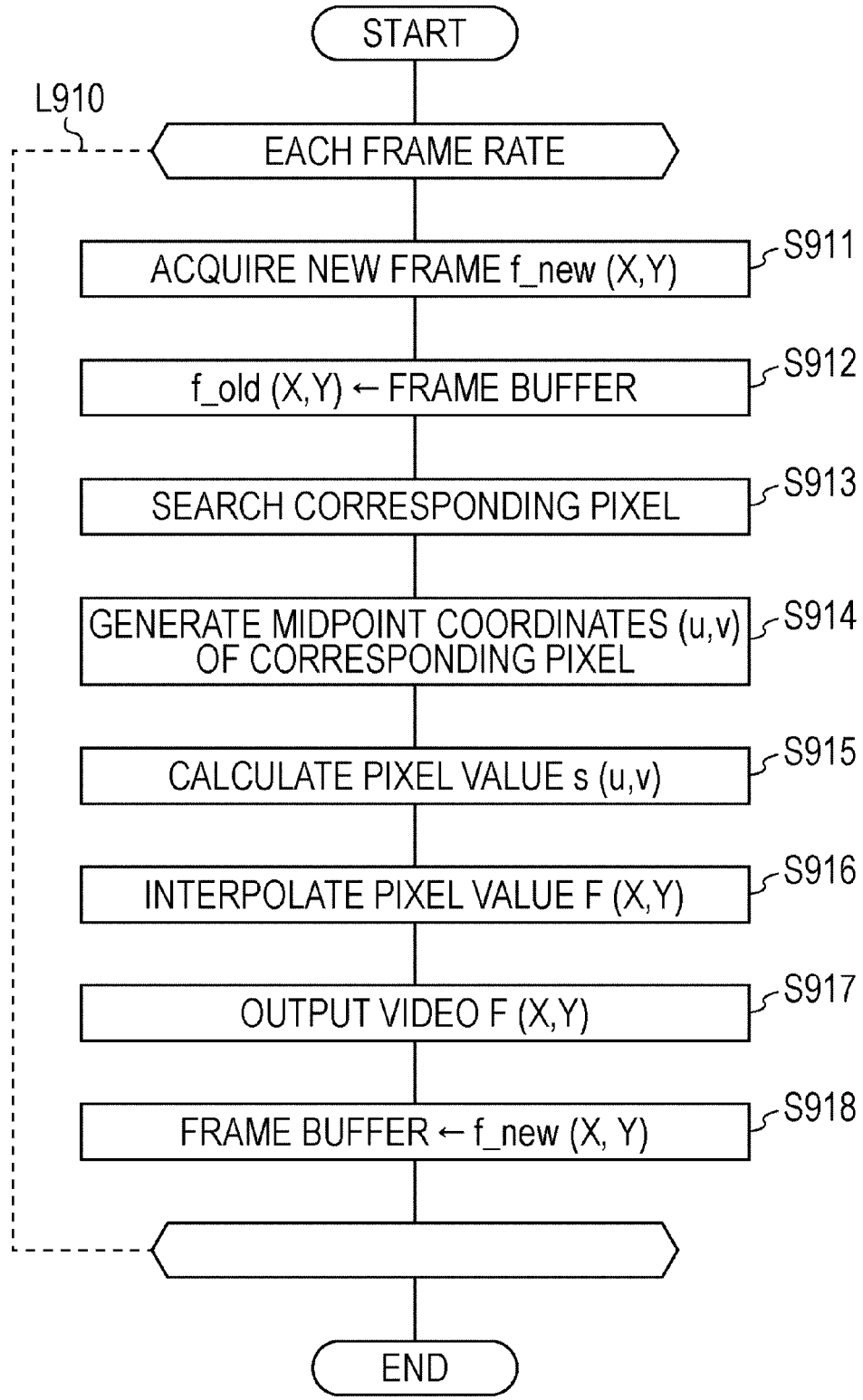

[Fig. 14]
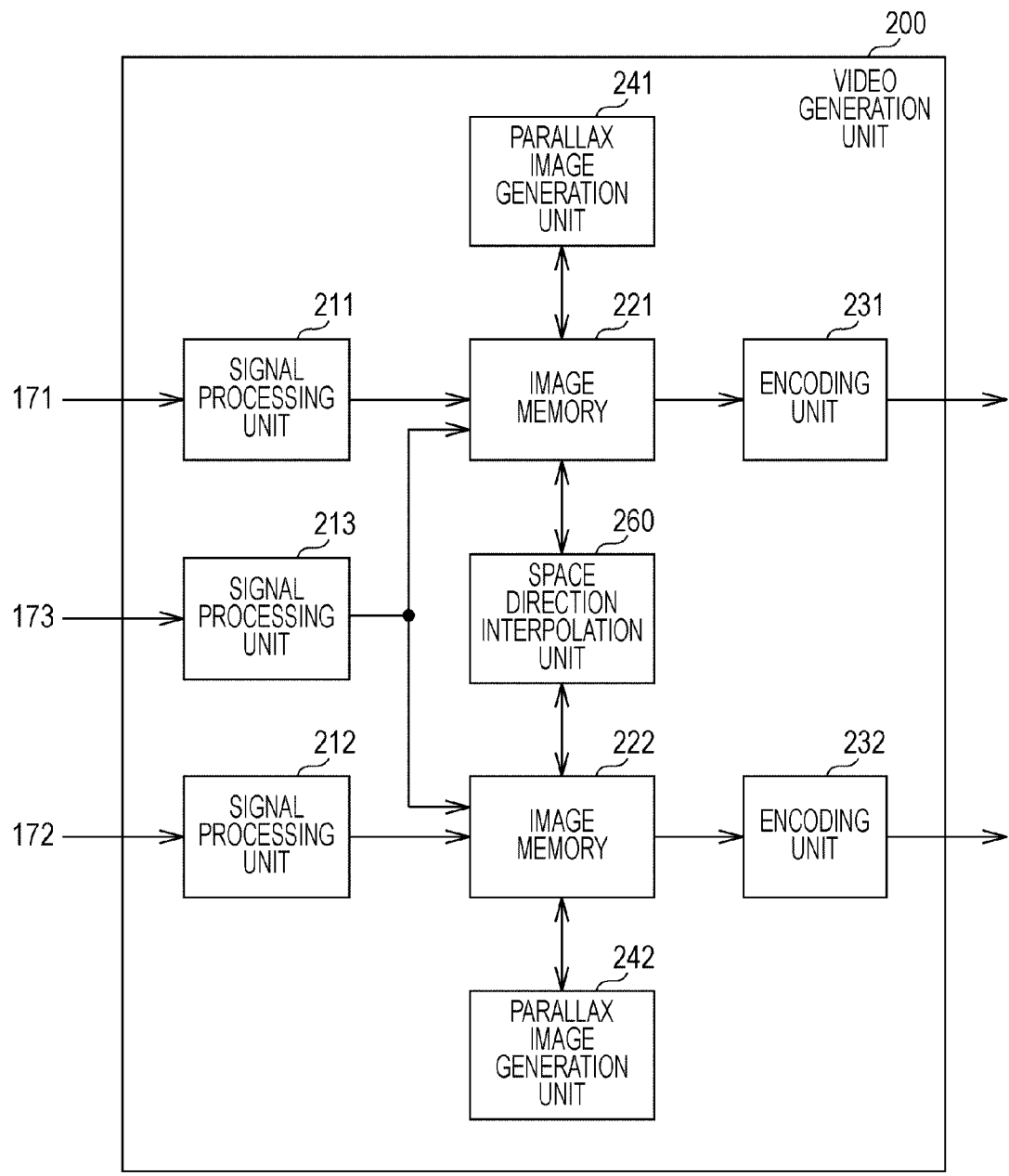

[Fig. 15]
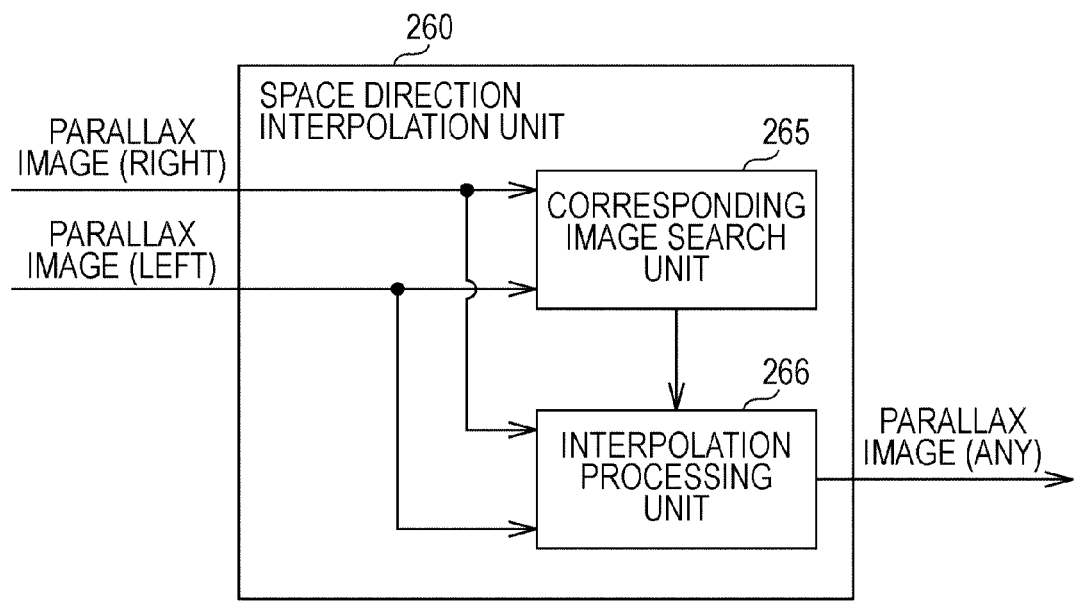

[Fig. 16]
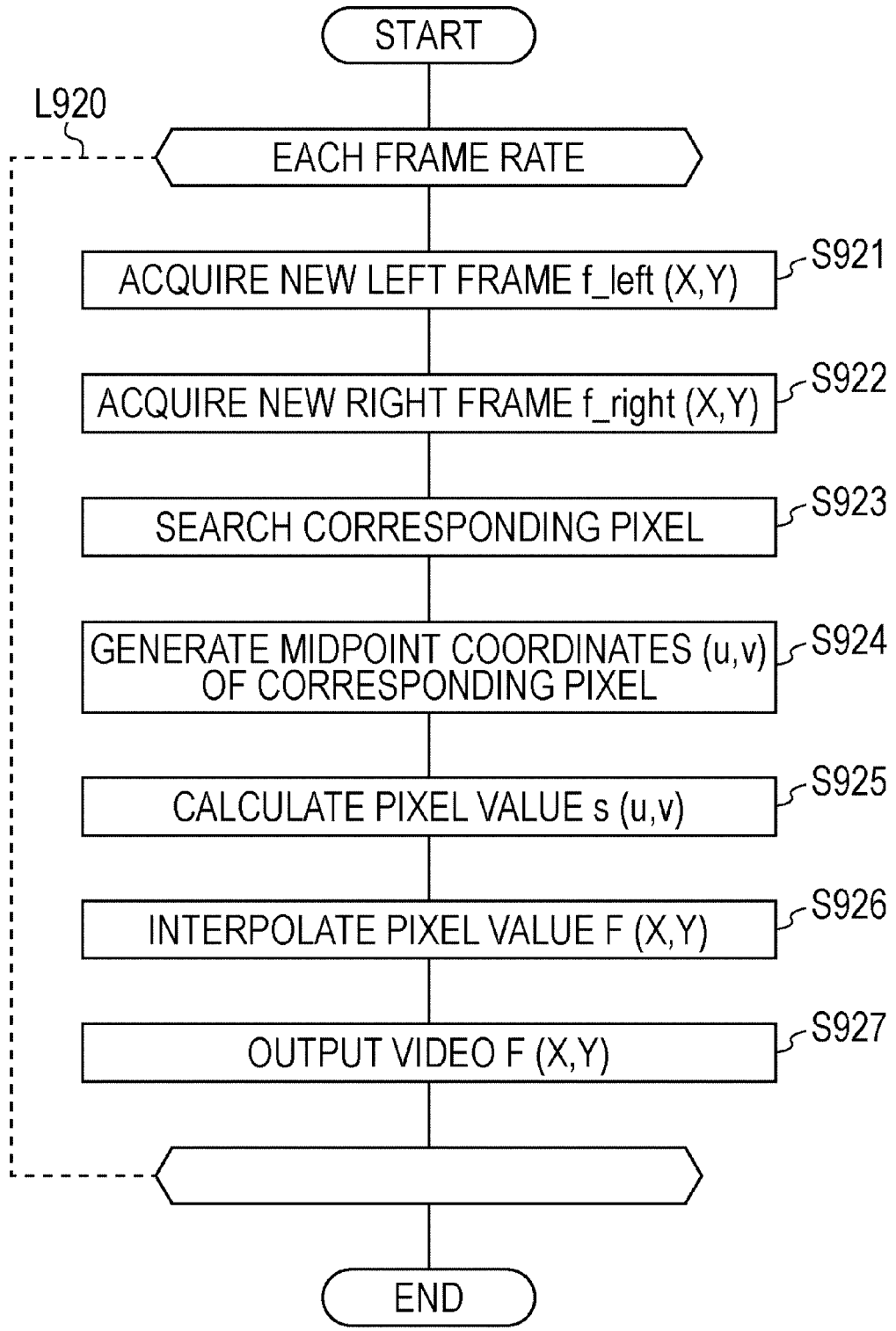

[Fig. 17]
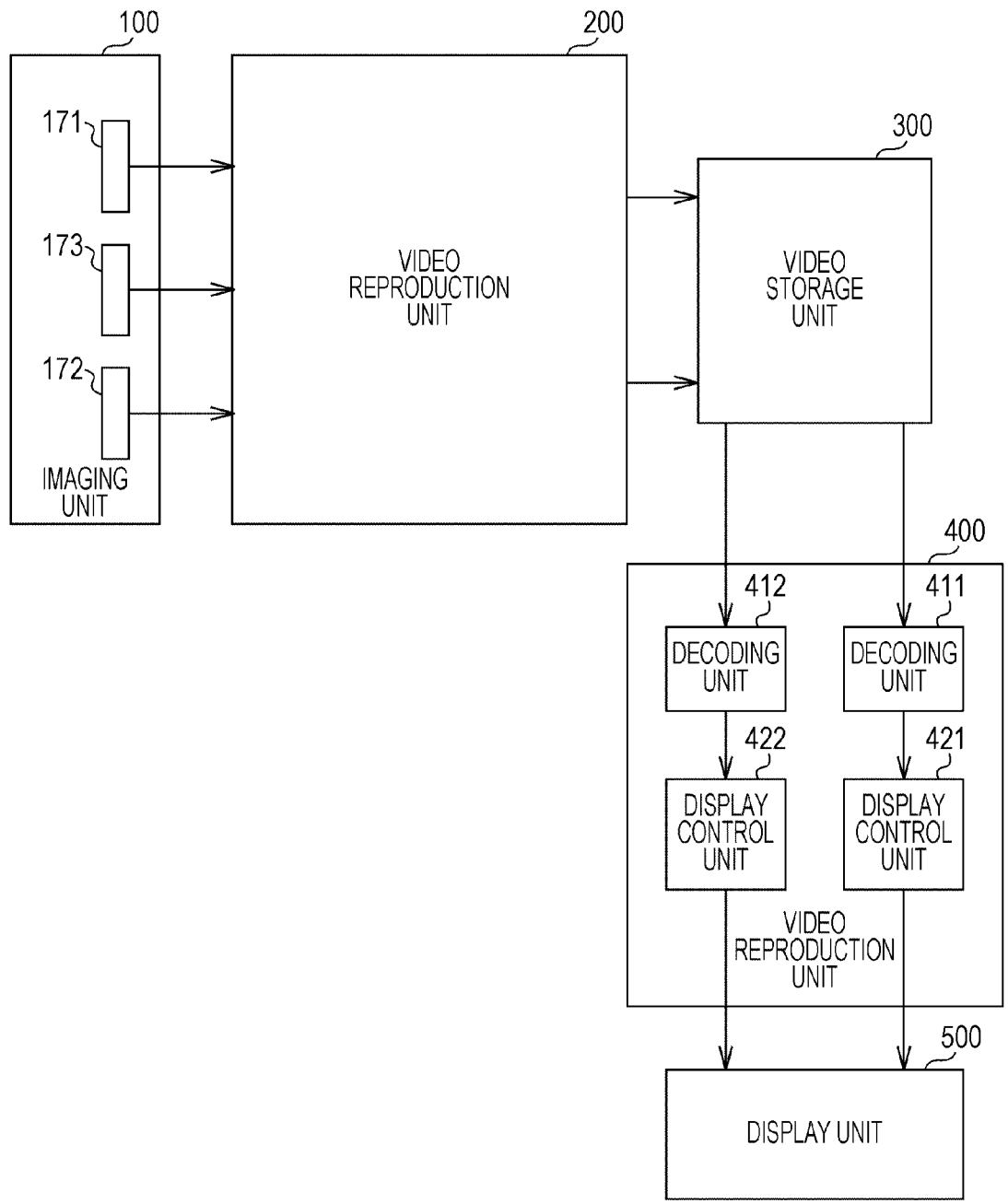

SPLITTING LIGHT TO GENERATE PARALLAX IMAGE

TECHNICAL FIELD

The present disclosure relates to an imaging apparatus, and more particularly, to an imaging apparatus imaging a subject as a stereoscopic image and a video recording and reproducing system.

BACKGROUND ART

From the past, systems have been proposed which simultaneously image a common subject using two right and left video cameras and simultaneously output the right and left videos to display a stereoscopic image. However, the system using two video cameras tends to be large in size and lacks mobility, deviation between optical axes of the right and left video cameras may occur, and it is difficult to obtain an image having a proper parallax. For example, there are such concerns that the distance between two video cameras may be increased, right and left optical axes may be deviated during zooming due to an individual difference between lenses of the video cameras, and the sizes of right and left screens may be different. Further, when a convergence operation of orienting right and left video cameras toward a subject is performed in a focus operation, there is a concern that the right and left video cameras may be deviated, for example, vertically.

When the deviation or the like occurs in the optical axes of the right and left video cameras, an optical system of a user who views a stereoscopic image is urged to carry out information processing different from normal processing, and thus visual fatigue may be caused. Further, when the user views overlapping right and left images without using stereoscopic glasses, the user may view a subject doubly, and thus an unnatural video may be created.

Accordingly, an imaging apparatus has been proposed in which light from a subject is separated into two light fluxes by a mirror to image the subject in a region of one lens pupil (for example, see PTL 1). In the imaging apparatus, right and left video data for a stereoscopic view can be obtained by performing imaging on each of the two separated light fluxes.

CITATION LIST

Patent Literature

PTL 1: JP 2010-81580A

SUMMARY

Technical Problem

According to the above-described technology of the related art, the right and left video data for a stereoscopic view can be obtained by separating the light from a subject into right and left light by a mirror. In this case, however, there is a concern that the beam-thickness of the separated light may be changed depending on an incident angle or the like of the light from the subject to the mirror, the brightness of right and left images may be imbalanced, and thus image quality may deteriorate.

The present technology is devised in light of the above-mentioned circumstances and an object of the present technology is to perform an imaging process of generating a high-quality stereoscopic image of which the image qualities of right and left images are uniform.

Solution to Problem

In order to resolve the above-described problems, according to some embodiments of the present technology, an imaging apparatus includes: a splitter configured to split light received from at least one subject into at least first and second components of light; a first imaging element configured to convert the first component of light into a first electrical signal representing a base image of the at least one subject; an optical arrangement configured to disperse the second component of light into at least a right component of light and a left component of light; a second imaging element configured to convert the right component of light into a second electrical signal representing a right detection image of the at least one subject at a first angle; and a third imaging element configured to convert the left component of light into a third electrical signal representing a left detection image of the at least one subject at a second angle different from the first angle. Thus, it is possible to obtain an operation of simultaneously generating the base image and the parallax detection images.

According to some further embodiments of the present technology, the imaging apparatus may further include at least one processor programmed to:
use a right detection image to transform a base image captured from at least one subject into a right parallax image, the right detection image being captured from the at least one subject at a first angle; and use a left detection image to transform the base image into a left parallax image, the left detection image being captured from the at least one subject at a second angle different from the first angle. Thus, it is possible to obtain an operation of generating the parallax image.

According to yet some further embodiments of the present technology, the at least one processor may be programmed to: search the right detection image to locate one or more pixels of the right detection image corresponding to at least one pixel of the base image; transform the base image into the right parallax image at least in part by moving the at least one pixel of the base image based on a location of the one or more corresponding pixels of the right detection image; search the left detection image to locate one or more pixels of the left detection image corresponding to the at least one pixel of the base image; and transform the base image into the left parallax image at least in part by moving the at least one pixel of the base image based on a location of the one or more corresponding pixels of the left detection image. Thus, it is possible to obtain an operation of generating the parallax image by moving the pixels of the base image to the positions of the corresponding pixels of the parallax detection image based on the search result.

According to yet some further embodiments of the present technology, the right parallax image may comprise a series of right parallax frames, and
the at least one processor may be further programmed to generate an interpolated frame based on first and second frames in the series of right parallax frames at least in part by: searching the first frame to locate one or more pixels of the first frame corresponding to one or more pixels of the second frame, and using a location of the one or more corresponding pixels of the first frame and a location of the one or more corresponding pixels of the second frame to determine a location of one or more corresponding pixels of the interpolated frame. Thus, it is possible to obtain an operation of improving the frame rate.

According to yet some further embodiments of the present technology, the at least one processor may be further programmed to generate an interpolated image based on the right and left parallax images at least in part by: searching the right detection image to locate one or more pixels of the right parallax image corresponding to one or more pixels of the left parallax image; and using a location of the one or more corresponding pixels of the right parallax image and a location of the one or more corresponding pixels of the left parallax image to determine a location of one or more corresponding pixels of the interpolated image. Thus, it is possible to obtain an operation of generating the parallax image at the viewpoint of any position.

According to yet some further embodiments of the present technology, the base image or the parallax detection image may be generated at a rate equal to or greater than 60 frames per second. Further, the parallax detection image may be generated at a rate of 230 frames to 250 frames per second. Further, the parallax detection image may be generated at a rate of 290 frames to 310 frames per second. Further, the parallax detection image may be generated at a rate of 590 frames to 610 frames per second.

According to yet some further embodiments of the present technology, a video recording and reproducing system includes: a splitter configured to split the parallel light received from at least one subject into at least first and second components of light; a first imaging element configured to convert the first component of light into a first electrical signal representing a base image of the at least one subject; an optical arrangement configured to disperse the second component of light into at least a right component of light and a left component of light; a second imaging element configured to convert the right component of light into a second electrical signal representing a right detection image of the at least one object at a first angle; a third imaging element configured to convert the left component of light into a third electrical signal representing a left detection image of the at least one subject at a second angle different from the first angle; at least one processor programmed to: use the right detection image to transform the base image into a right parallax image; and use the left detection image to transform the base image into a left parallax image; and a display unit configured to display the right and left parallax images. Thus, it is possible to obtain an operation of imaging and reproducing the high-quality parallax image.

Advantageous Effects of Invention

According to the present technology, it is possible to obtain the advantageous effect of performing an imaging process of generating a high-quality stereoscopic image of which the image qualities of right and left images are uniform.

BRIEF DESCRIPTION OF DRAWINGS

FIG. 1 is a diagram illustrating an example of the configuration of an imaging unit according to an embodiment of the present technology.

FIG. 2 is a diagram illustrating examples of the configurations of imaging elements 171 to 173 according to the embodiment of the present technology.

FIG. 3 is a diagram illustrating an image of a pupil 115 in the imaging unit according to the embodiment of the present technology.

FIG. 4 is a diagram illustrating a relation between a centroid-to-centroid distance D and a base line length (baseline).

FIG. 5 is a diagram illustrating a relation between magnification by zoom and parallax.

FIG. 6 is a diagram illustrating an example of the configuration of an imaging apparatus according to a second embodiment of the present technology.

FIG. 7 is a diagram illustrating an example of the configuration of a video generation unit 200 according to the second embodiment of the present technology.

FIG. 8 is a diagram illustrating examples of the configurations of parallax image generation units 241 and 242 according to the second embodiment of the present technology.

FIG. 9 is a flowchart illustrating an example of a process of the imaging apparatus according to the second embodiment of the present technology.

FIG. 10 is a diagram illustrating an example of the configuration of a video generation unit 200 according to a third embodiment of the present technology.

FIG. 11 is a diagram illustrating an example of the configuration of a video generation unit 200 according to a fourth embodiment of the present technology.

FIG. 12 is a diagram illustrating examples of the configurations of time direction interpolation units 251 and 252 according to the fourth embodiment of the present technology.

FIG. 13 is a flowchart illustrating an example of processes of the time direction interpolation units 251 and 252 according to the fourth embodiment of the present technology.

FIG. 14 is a diagram illustrating an example of the configuration of a video generation unit 200 according to a fifth embodiment of the present technology.

FIG. 15 is a diagram illustrating an example of the configuration of a space direction interpolation unit 260 according to the fifth embodiment of the present technology.

FIG. 16 is a flowchart illustrating an example of a process of the space direction interpolation unit 260 according to the fifth embodiment of the present technology.

FIG. 17 is a diagram illustrating an example of the configuration of a video recording and reproducing system according to a sixth embodiment of the present technology.

DESCRIPTION OF EMBODIMENTS

Hereinafter, modes (hereinafter, referred to as embodiments) for embodying the present technology will be described. The description will be made in the following order.

1. First Embodiment (Example of Imaging Unit Generating Base Image and Parallax Detection Image)
2. Second Embodiment (Example of Imaging Apparatus Generating Parallax Image Based on Base Image and Parallax Detection Image)
3. Third Embodiment (Example of Imaging Apparatus Generating Parallax Image Based on RAW Images of Base Image and Parallax Detection Image)
4. Fourth Embodiment (Example of Imaging Apparatus Performing Time Direction Interpolation)
5. Fifth Embodiment (Example of Imaging Apparatus Performing Space Direction Interpolation)
6. Sixth Embodiment (Example of Video Recording and Reproducing System)

1. First Embodiment

"Configuration of Imaging Unit"

FIG. 1 is a diagram illustrating an example of the configuration of an imaging unit according to an embodiment of the present technology. FIG. 1a is a side sectional view when a subject is viewed from the left side and FIG. 1b is a plan sectional view. In FIG. 1b, an upper side is the right direction toward the subject and a lower side is the left direction toward the subject. Note that, in FIG. 1b, an upper mirror 142, a condenser lens 153, and an imaging element 173 are not illustrated.

The imaging unit receives incident light 101 from a subject, forms an image on left and right imaging elements 171 and 172 and a middle imaging element 173, and generates left, right, and middle video data. An exchange lens 110 is configured to be mounted on the body of the imaging unit through a lens mount 120. The exchange lens 110 is a lens group that condenses the incident light 101 from the subject and includes not only a lens group such as a focus lens that performs focusing or a zoom lens that magnifies the subject but also a diaphragm 113 of the exchange lens 110. A pupil 115 is an image of an aperture diaphragm when a lens is viewed from a subject side or an image formation side. Note that the exchange lens 110 is an example of a photographing lens described in claims.

The lens mount 120 mounts the exchange lens 110 on the body of the imaging unit. Inside the lens mount 120, an image of condensed light is once formed and is an inverted image inverted right and left.

A relay lens unit 130 is disposed in the next stage of the lens mount 120. The relay lens unit 130 includes a lens that transmits the light condensed up to the lens mount 120 to a parallel light region 140. The light condensed up to the lens mount 120 forms an aerial image 131. The light diffused from a point light source at an objective focal position (that is, the position of the subject) of the exchange lens 110 is turned into parallel light in the region 140 by a lens of the relay lens unit 130. In the parallel light region 140, a diaphragm different from the diaphragm 113 may be further provided. Note that the relay lens unit 130 is an example of a relay lens described in claims.

A transmissive mirror 141 and mirrors 143 to 146 are disposed in the next stage of the relay lens unit 130. The transmissive mirror 141 and the mirrors 143 to 146 are disposed at the position of the parallel light region 140 and are spectroscopic mirrors that disperse the condensed light. First, the entire amount of light as the same photographing target is transmitted and reflected by the transmissive mirror 141 having arbitrarily set reflectance, and thus is dispersed into two sets of light beams. In this case, images contained in the transmitted and reflected light is the same.

The transmissive mirror 141 is a mirror that reflects and transmits the received light. The transmissive mirror 141 can be realized by, for example, an AR coat (Anti-Reflection Coat) in which a thin film is deposited on a glass surface. The AR coat can control transmittance by controlling the reflectance of the thin film. For example, when a half mirror that transmits 50% of light and reflects 50% of light is used, 50% of the incident light is reflected toward the side of the mirror 142 and 50% of the incident light is transmitted toward the side of the mirrors 143 to 146. In another embodiment, a transmissive mirror that transmits 40% of light and reflects 60% of light is used, 60% of the incident light is reflected toward the side of the mirror 142 and 40% of the incident light is transmitted toward the side of the mirrors 143 to 146. Other percentages may also be suitable, as aspects of the present disclosure is not limited to any particular percentages.

The light reflected by the transmissive mirror 141 is reflected by the mirror 142 disposed in the upper direction and is then incident on the condenser lens 153. The component of the light transmitted through the transmissive mirror 141 and viewed from the left side to the subject is reflected toward the mirrors 143 and 145 by right and left inversion. Likewise, the component of the light transmitted through the transmissive mirror 141 and viewed from the right side to the subject is reflected toward the mirrors 144 and 146. Thus, the light transmitted through the transmissive mirror 141 is dispersed right and left by the mirrors 142 to 146. Since the positions at which the mirrors 143 and 144 are disposed are included in the parallel light region 140, the components of the light viewed from the right and left sides are each dispersed. As in one of the above-described examples, when 50% of the incident light is transmitted to the side of the mirrors 143 to 146, the transmitted light is dispersed by the mirrors 143 and 144, and therefore each amount of light becomes 25% of the incident light. Likewise, in an alternative embodiment, when 40% of the incident light is transmitted to the side of the mirrors 143 to 146, the transmitted light is dispersed by the mirrors 143 and 144, and therefore each amount of light becomes 20% of the incident light.

The light dispersed by the transmissive mirror 141, the mirror 143, and the mirror 145, that is, the light with the component, when the subject is viewed from the left side, is incident on the condenser lens 151 for image formation. Further, the light dispersed by the transmissive mirror 141, the mirror 144, and the mirror 146, that is, the light with the component, when the subject is viewed from the right side, is incident on the condenser lens 152 for image formation. The light reflected by the transmissive mirror 141 and the mirror 142, that is, the light with the component, when the subject is viewed from the middle side, is incident on the condenser lens 153 for image formation.

The condenser lenses 151 and 152 form images of the incident light on light-receiving surfaces of the imaging elements 171 and 172, respectively. The condenser lens 153 forms an image of the incident light on a light-receiving surface of the imaging element 173. The light incident on the imaging elements 171 to 173 has each erected image. Here, the example has been described in which the light transmitted through the transmissive mirror 141 is dispersed right and left, and the reflected light forms a single image, but the example may be modified. That is, the light reflected by the transmissive mirror 141 may be separated right and left and the transmitted light may directly form an image. Note that the condenser lenses 151 and 152 are examples of an image forming lens described in claims.

The imaging elements 171 to 173 are photoelectric conversion elements that convert the light incident from the condenser lenses 151 to 153 into electric signals, respectively. The imaging elements 171 to 173 are realized by, for example, a CCD (Charge Coupled Devices) image sensor or a CMOS (Complementary Metal Oxide Semiconductor) image sensor.

The imaging elements 171 and 172 are used to generate a parallax detection image configured to detect parallax information of a stereoscopic view. The imaging element 173 is used to generate a base image which is a basis of a parallax image configured to be used for a stereoscopic view. The base image is required to have higher image quality than the parallax detection image. This is because the image quality of the base image is reflected on the image quality of the parallax image, while the parallax detection image is configured to detect the parallax information.

FIG. 2 is a diagram illustrating examples of the configurations of the imaging elements 171 to 173 according to the embodiment of the present technology. FIG. 2a shows an example of the configuration of the imaging element 173. FIG. 2b shows examples of the configurations of the imaging elements 171 and 172. In these examples, each of the imaging elements 171 and 172 that generate the parallax detection images has the number of pixels of 1920 horizontal pixels and 1080 vertical pixels. Further, the imaging element 173 that generates the base image has the number of pixels of 3840 horizontal pixels and 2160 vertical pixels. All of the imaging elements have a ratio of horizontal 16:vertical 9. However, even when the ratios of the imaging elements are not the same, the present technology may be applied.

Further, the diagonal size of each of the imaging elements 171 and 172 is, for example, ½ inches. Further, the diagonal size of the imaging element 173 is, for example, ⅔ inches.

Thus, the base image having higher image quality than the parallax detection images can be generated by setting the resolutions of the imaging elements 171 to 173.

Further, an image generation rate of the imaging elements 171 and 172 may be the same as or different from an image generation rate of the imaging element 173. When the pixel number of the imaging pixels 173 is set to be higher than that of the imaging elements 171 and 172, the image generation rate of the imaging element 173 may be considered to be set lower. When the numbers of pixels described above are set, for example, the image generation rates of the imaging elements 171 and 172 can be considered to be set to 240 frames per second and the image generation rate of the imaging element 173 can be considered to be set to 120 frames per second. Thus, the space resolution of the imaging element 173 and the time resolutions of the imaging elements 171 and 172 can be separately used.

In movies, the frame rate of 24 frames per second (24 Hz) is used as a standard. In televisions, the frame rate of 60 frames per second (60 Hz) is used as a standard. In the embodiment of the present technology, a captured image is generated from an electric signal at a rate equal to or greater than 60 frames per second (60 Hz) and preferably at a rate of 230 frames per second (240 Hz ? 10 Hz) in consideration of blurring or jerkiness caused due to movement. Thus, the lack of the resolution in a time direction is resolved. Further, in consideration of broadcasting schemes, a rate of 290 frames to 310 frames per second (300 Hz ? 10 Hz) is preferable as the common multiple between 50 frames per second (50 Hz) commonly used in Europe and 60 frames per second (60 Hz) commonly used in Japan and America. Further, a rate of 590 frames to 610 frames per second (600 Hz ? 10 Hz) is important as the common multiple for which the rate of 24 frames per second (24 Hz) of movies is added, since image processing such as an image synthesis process or a rate conversion process can be easily performed. Accordingly when the image generation rates of the imaging elements 171 to 173 are set, these rates are preferably considered.

"Division of Pupil"

FIG. 3 is a diagram illustrating an image of the pupil 115 in the imaging unit according to the embodiment of the present technology. The pupil refers to an image of an aperture diaphragm when a lens is viewed from a subject side or an image formation side. In the imaging unit according to the embodiment of the present technology, the following equation is satisfied when it is assumed that a radius of a circle corresponding to the pupil 115 is r, $$2 \times r = f/F \qquad \text{(Equation 1)}$$

where f is a focal distance and F is an F value. Accordingly, when the focal distance is fixed, the diameter "2×r" of the pupil 115 and the F value can be understood to have an inverse relation.

In the embodiment of the invention, right and left semicircles obtained by dividing the circle of the pupil 115 right and left to disperse the condensed light right and left in the parallel light region will be described. As described above, the sense of stereoscopy can be obtained based on a parallax (relative parallax) between both eyes. At this time, the optical axis determining the parallax is considered to pass through the centroid of each of the right and left semicircles. The centroid of the semicircle with the radius r can be calculated geometrically and is located at a position distant by "(4×r)/(3×Pi)" from the center of the circle. Here, Pi is the ratio of the circumference of a circle to its diameter. Accordingly, the distance (centroid-to-centroid distance D) between a centroid 501 of the left semicircle and a centroid 502 of the right semicircle is satisfied as in the following equation.

$$D = (8 \times r)/(3 \times Pi) \qquad \text{(Equation 2)}$$

That is, the centroid-to-centroid distance D decreases proportionally when the diaphragm 113 is narrowed. In other words, the sense of stereoscopy can be adjusted by changing the aperture of the diaphragm 113. The results obtained from an experiment to confirm this presupposition are as follows.

"Relation Between Centroid-to-Centroid Distance and Base Line Length (Baseline)"

FIG. 4 is a diagram illustrating a relation between the centroid-to-centroid distance D and a base line length (baseline). Here, the theoretical value of the centroid-to-centroid distance and the experiment value of the base line length between two kinds of lenses #A and #B as the exchange lens 110 are shown.

The lens #A is a zoom lens that has the open F value of 1.8 and the focal distance of 10 to 100 [mm (millimeter)]. The zoom ratio of lens #A is 10 times and the focal distance at the wide end is 10 [mm]. The lens #B is a zoom lens that has the open F value of 2.8 and the focal distance of 13.5 to 570 [mm]. The zoom ratio of lens #B is 42 times and the focal distance at the wide end is 13.5 [mm]. In lens #A and lens #B, a photographing distance is assumed to be 6.5 [m (meter)].

The centroid-to-centroid distances D of lens #A and lens #B are calculated to 23.1 [mm] and 14.9 [mm], respectively, by Equation 1 and Equation 2 described above. On the other hand, the base line length of lens #A and lens #B calculated in an actual apparatus by the experiment are 20.0 [mm] and 12.0 [mm], respectively. From the experiment result, it can be understood that the centroid-to-centroid distance D of the semicircle of the pupil which is an image of the diaphragm 113 is almost equal to the base line length, although this distance is seen to decrease from the theoretical value supposed by diffraction effect. Further, it is shown that the centroid-to-centroid distance D can be changed by the aperture of the diaphragm 113 by Equation 2 described above, and thus the base line length can be controlled by the aperture of the diaphragm 113.

In the example of the configuration according to the embodiment of the present technology, the minimum value of the centroid-to-centroid distance D can be supposed to be about 7 [mm]. It is considered that the sense of stereoscopy can be felt with the base line length of this value. In particular, when the photographing distance is long, it is considered that the sense of stereoscopy may not be realized when the base line length has a certain value. When the base line length gradually increases and becomes about 32 [mm], the sense of stereoscopy becomes further clear, but the background is gradually blurred. Further, when the base line length exceeds 65 [mm], it is considered that a miniature landscape effect occurs, and thus an unnatural screen is made. Accordingly, it is considered that the range of the base line length in which a stereoscopic video is viewed to be natural is about 7 to 65 [mm].

"Relation Between Magnification by Zoom and Parallax"

FIG. 5 is a diagram illustrating a relation between magnification by zoom and a parallax. In "a" of FIG. 5, it is assumed that L is the position of a left eye, R is the position of a right eye, and A and B are points of a subject image. When it is assumed that a convergence angle ThetaA of point A is an angle LAR (absolute parallax) including point A and a convergence angle ThetaB of point B is an angle LBR (absolute parallax) including point B, a parallax (relative parallax) d between point A and point B is calculated by an equation below. Further, the relative parallax is simply referred to as a "parallax."

$$d = ThetaB - ThetaA$$

Here, when it is assumed that h is an angle ALB and g is an angle ARB, the convergence angle ThetaA is substantially the same as h and the convergence angle ThetaB is substantially the same as g. Accordingly, an equation below is satisfied:

$$d = g - h$$

Further, when it is assumed that D is an interocular distance, DA is a distance from the both eyes to point A, DB is a distance from the both eyes to point B, Delta is a distance between point A and point B viewed from both eyes, an equation below is satisfied:

$$d \text{ "nearly equal to" } D \times Delta / (DA^2 - Delta \times DA).$$

Here, d "nearly equal to" $D \times Delta/DA^2$ is satisfied since DA and DB>>D.

In "b" of FIG. 5, it shows a positional relation when magnification of n times is performed compared to "a" of FIG. 5. Here, an angle, a position, and a distance changed after zooming is expressed by adding a dash after each sign. Since magnification of n times is performed, equations below are satisfied:

$$g' = n \times g, \text{ and}$$

$$h' = n \times h.$$

At this time, a parallax d' is expressed by equations below:

$$d' = DB' - DA' = g' - h' = n(g-h) = n \times d$$

That is, n parallaxes are generated by the magnification of n times. This means that the sense of stereoscopy is improved when zooming is performed to the telescopic-end side. In other words, in zoom photographing, an appropriate parallax can be obtained even when the base line length is short.

Thus, according to the first embodiment of the present technology, the parallax of an image viewed to both eyes can be appropriately decreased by dispersing the light condensed by the single exchange lens 110 to the right and left sides by the mirrors 143 to 146. The parallax obtained in the embodiment of the present technology can be controlled using the aperture of the diaphragm 113 and a zoom ratio (magnifying power) in zoom photographing. In general, it is considered that the sensitivity of eyes to a parallax is high, and resolution higher by one order is present for a parallax while normal visual power is minute order at an angle of sight (C. W. Tyler, "Spatial Organization of Binocular Disparity Sensitivity", Vision Research Vol. 15, pp. 583 to 590, Pergamon Press (1975)). Accordingly, it is important to appropriately reduce a parallax in order to reduce visual fatigue by causing the sense of stereoscopy naturally to be perceived even under the condition that a parallax is less than the parallax described in the above-described example.

Further, according to the first embodiment, the high-quality base image can be photographed in addition to the parallax detection image. The high-quality parallax image to be described below can be generated using the base image and the parallax detection image.

2. Second Embodiment

"Configuration of Imaging Apparatus"

FIG. 6 is a diagram illustrating an example of the configuration of an imaging apparatus according to a second embodiment of the present technology. A video recording and reproducing system includes an imaging unit 100, a video generation unit 200, and a video storage unit 300.

The imaging unit 100, which is the imaging unit described in the first embodiment, receives incident light from a subject, generates parallax detection images using the imaging elements 171 and 172, and generates a base image using the imaging element 173.

The video generation unit 200 generates a high-quality parallax image based on the base image and the parallax detection images output from the imaging unit 100 and records video data of the parallax image in the video storage unit 300. The configuration of the video generation unit 200 will be described below.

The video storage unit 300 stores the video data of the parallax image output from the video generation unit 200.

"Configuration of Video Generation Unit"

FIG. 7 is a diagram illustrating an example of the configuration of the video generation unit 200 according to the second embodiment of the present technology. The video generation unit 200 includes signal processing units 211 to 213, image memories 221 and 222, parallax image generation units 241 and 242, and encoding units 231 and 232.

The signal processing units 211 to 213 receive video data of the base image and the parallax detection images output from the imaging unit 100 and perform predetermined signal processing. The signal processing units 211 to 213 A/D (Analog to Digital) convert the imaged data and perform various kinds of signal processing such as a demosaic process and a white balance adjustment process.

The parallax image generation units 241 and 242 generate the parallax image based on the base image and the parallax detection images. The parallax image generation units 241 and 242 will be described in detail below.

The image memories 221 and 222 are memories that temporarily store the video data processed by the signal processing units 211 to 213 and the video data of the parallax images generated by the parallax image generation units 241 and 242.

The encoding units 231 and 232 encode the video data of the parallax images stored in the image memories 221 and 222 and output the video data of the parallax images to the video storage unit 300.

"Configuration of Parallax Image Generation Unit"

FIG. 8 is a diagram illustrating an example of the configurations of the parallax image generation unit 241 and 242 according to the second embodiment of the present technology. The parallax image generation units 241 and 242 each include a corresponding pixel search unit 245 and a pixel movement unit 246.

The corresponding pixel search unit 245 searches for pixels of the base image corresponding to pixels of the parallax detection images. The corresponding pixel search unit 245 sets search regions in right and left images of the parallax detection images and searches for corresponding pixels using a partial region of the base image as a template. In this searching process, a correlation efficient method, an SSDA (Sequential Similarity Detection Algorithm) method, least square matching, or the like is used. That is, evaluation is performed on each constant unit of pixels by correlation calculation, difference absolute sum calculation, or the like, and pixels with the maximum correlation or pixels with the minimum difference absolute sum are searched for as the corresponding pixels.

Here, for example, when the corresponding pixels are searched for using a sum of squared difference or a sum of absolute difference, evaluation is performed as follows. First, a search region of p horizontal pixels by q vertical pixels is set in the parallax detection image of X horizontal pixels by Y vertical pixels. Further, a search region of m horizontal pixels by n vertical pixels is set in the base image. Here, m is an integer smaller than p and n is an integer smaller than q. With the search region of the base image being sequentially moved in the search region of the parallax detection image, the sum of squared difference or the sum of absolute difference is calculated.

When it is assumed that I (i, j) is a pixel value of the parallax detection image and T(i, j) is a pixel value of the base image, the sum of squared difference (SSD) is calculated by an equation below.

$$R_{SSD} = \sum_{i=0}^{m-1}\sum_{j=0}^{n-1}(I(i, j) - T(i, j))^2 \quad \text{[Math. 1]}$$

Further, the sum of absolute difference (SAD) is calculated by an equation below.

$$R_{SAD} = \sum_{i=0}^{m-1}\sum_{j=0}^{n-1}|I(i, j) - T(i, j)| \quad \text{[Math. 2]}$$

A pixel located at the center of the template at the position at which the sum of squared difference or the sum of absolute difference is the minimum is the corresponding pixel. Since the region at which the sum of absolute difference is the minimum is the region at which the base image is the most similar to the parallax detection image, it can be supposed that the same subject is displayed in the corresponding pixels.

On the other hand, for example, when the corresponding pixels are searched for using a normalized correlation coefficient, evaluation is performed as follows. The relation between the search region of the parallax detection image and the search region of the base image is the same as that described above. The normalized correlation coefficient is calculated by sequentially moving the search region of the base image in the search region of the parallax detection image.

The normalized correlation coefficient (NCC) is calculated by an equation below.

$$R_{NCC} = \frac{\sum_{i=0}^{m-1}\sum_{j=0}^{n-1}I(i, j)T(i, j)}{\sqrt{\sum_{i=0}^{m-1}\sum_{j=0}^{n-1}I(i, j)^2 \times \sum_{i=0}^{m-1}\sum_{j=0}^{n-1}T(i, j)^2}} \quad \text{[Math. 3]}$$

A pixel located at the center of a template at the position at which the normalized correlation coefficient is the maximum is the corresponding pixel. The corresponding pixel can be detected with high accuracy using the normalized correlation coefficient, even when there is a difference between luminance of the parallax detection image and luminance of the base image.

The pixel movement unit 246 generates the parallax image by moving the pixels of the base image to the positions of the corresponding pixels of the parallax detection image based on information regarding the corresponding pixels searched for by the corresponding pixel search unit 245. When the number of pixels of the base image is not identical to the number of pixels of the parallax detection image, the pixel value of the parallax image may be calculated by performing interpolation from the plurality of pixels of the base image.

In this embodiment, regarding the parallax detection image, only the parallax information thereof is used, and the image quality such as brightness or resolution of the base image is used. Thus, the right and left parallax images of which image qualities are uniform can be obtained.

"Process of Imaging Apparatus"

FIG. 9 is a flowchart illustrating an example of a process of the imaging apparatus according to the second embodiment of the present technology. First, the incident light from a subject is guided to the parallel light region 140 through the exchange lens 110 and the relay lens unit 130, and then is separated by the transmissive mirror 141 and the mirrors 143 to 146 (step S901).

The light guided to the condenser lens 153 by the transmissive mirror 141 and the mirror 142 is photoelectrically converted by the imaging element 173, and thus the base image is generated (step S902). Further, the light guided to the condenser lenses 151 and 152 by the mirrors 143 to 146 is photoelectrically converted by the imaging elements 171 and 172, and the parallax detection images are generated (step S902). The base image and the parallax detection images are independently generated and the generation rates of these images may be different from each other.

Then, the corresponding pixel search units 245 of the parallax image generation units 241 and 242 search for the corresponding pixels between the base image and the parallax detection images (step S903). The corresponding pixels are searched for in the right and left parallax detection images.

Then, the pixel movement units 246 of the parallax image generation units 241 and 242 generate the parallax images by moving the pixels of the base image to the positions of the corresponding pixels of the parallax detection images based on the information regarding the corresponding pixels (step S904).

Thus, according to the second embodiment, the right and left parallax images of which image qualities are uniform can be obtained, since the image quality such as brightness or resolution of the base image can be reflected on the parallax images by generating the parallax images using the pixels of the single high-quality base image.

3. Third Embodiment

In the second embodiment, the parallax images are generated based on the base image and the parallax detection images stored in the image memories 221 and 222. In a third embodiment, parallax images are generated before the base image and the parallax detection images are stored in the image memories 221 and 222. That is, in the third embodiment, the parallax images are generated based on the base image and the parallax detection images which are RAW images without using the signal processing unit 213. Further, since the overall configuration of an imaging apparatus is the same as the configuration described with reference to FIG. 6, the description thereof will not be repeated.

"Configuration of Video Generation Unit"

FIG. 10 is a diagram illustrating an example of the configuration of a video generation unit 200 according to the third embodiment of the present technology. The video generation unit 200 according to the third embodiment does not include the signal processing unit 213 shown in FIG. 7 and has a configuration in which parallax image generation units 241 and 242 are connected to signal processing units 211 and 212, respectively.

The signal processing units 211 and 212 each receive video data of the base image and the parallax detection images output from the imaging unit 100, perform A/D conversion, and supply the results to the parallax image generation units 241 and 242.

The parallax image generation units 241 and 242 generate the parallax images based on the video data of the base image and the parallax detection images supplied from the signal processing units 211 and 212 and supply the parallax images to the signal processing units 211 and 212, respectively. Further, since the configurations of the parallax image generation units 241 and 242 are the same as the configurations described with reference to FIG. 8, the description thereof will not be repeated.

Then, the signal processing units 211 and 212 perform various kinds of signal processing such as a demosaic process and a white balance adjustment process on the parallax images supplied from the parallax image generation units 241 and 242, and store the results in the image memories 221 and 222, respectively.

The encoding units 231 and 232 encode the video data of the parallax images stored in the image memories 221 and 222 and output the encoded video data to the video storage unit 300.

Thus, according to the third embodiment, the higher-quality parallax images can be obtained by generating the parallax images based on the base image and the parallax detection images which are the RAW images.

4. Fourth Embodiment

In a fourth embodiment, an image at any time is generated by interpolating a parallax image in a time direction. Further, since the overall configuration of an image apparatus is the same as the configuration described with reference to FIG. 6, the description thereof will not be repeated.

"Configuration of Video Generation Unit"

FIG. 11 is a diagram illustrating an example of the configuration of a video generation unit 200 according to a fourth embodiment of the present technology. The video generation unit 200 according to the fourth embodiment is different from that according to the second embodiment in that time direction interpolation units 251 and 252 are connected to image memories 221 and 222, respectively. The time direction interpolation units 251 and 252 interpolate video data of parallax images stored in the image memories 221 and 222 in a time direction.

"Configuration of Time Direction Interpolation Unit"

FIG. 12 is a diagram illustrating examples of the configurations of the time direction interpolation units 251 and 252 according to the fourth embodiment of the present technology. The time direction interpolation units 251 and 252 each include a frame buffer 254, a corresponding pixel search unit 255, and an interpolation processing unit 256.

The frame buffer 254 is a buffer that stores the video data of the parallax image for each frame. The video data of the parallax image includes time-series frames. When the frames are stored temporarily in the frame buffer 254, different frames can be compared to each other in the corresponding pixel search unit 255. For example, when the immediately preceding frame of the video data of the parallax image is stored in the frame buffer 254, both the current frame supplied from the image memory 221 or 222 and the immediately preceding frame can be supplied to the corresponding pixel search unit 255. Note that, since right and left images are present as the parallax images, the frame buffer 254 needs to store at least two frames.

The corresponding pixel search unit 255 searches for the corresponding pixels of the current frame of the video data of the parallax image and the frame stored in the frame buffer 254 by comparing the current frame to the stored frame. The corresponding pixel search unit 255 provides a search region of each of the right and left images of the parallax images stored in the frame buffer 254 and searches for corresponding pixels using a partial region of the current parallax image as a template. Since the same method as that of the above-described corresponding pixel search unit 245 can be used in this search process, the description thereof will not be repeated.

The interpolation processing unit 256 generates a pixel value at any time through the interpolation based on information regarding the corresponding pixels searched for by the corresponding pixel search unit 255. Here, the parallax image stored in the frame buffer 254 is referred to as previous data and the current parallax image supplied from the image memory 221 or 222 is referred to as current data. First, a pixel value s (u, v) is calculated from the average value of the pixel values of two corresponding pixels at the midpoint coordinates (u, v) of a moving vector connecting the corresponding pixels of the previous data and the current data to each other.

In this case, a u-v space is not necessarily identical to an X-Y space of the parallax image. Accordingly, a pixel value F (X, Y) of the X-Y space is generated from the pixel value s (u, v) of the entire region through an interpolation process. In this case, for example, a linear interpolation method described below can be used as the interpolation process. Here, it is assumed that F0 is the pixel value F (X, Y) to be calculated, si is the known pixel value s (u, v), and t is the number of proximal points used for the calculation. Further, it is assumed that wi is a weight, and the reciprocal of the distance to the coordinates (X, Y) can be used.

$$F_0 = \frac{\sum_{i=1}^{t} s_i w_i}{\sum_{i=1}^{t} w_i}$$

[Math. 4]

Here, the pixel value at the midpoint of the moving vector is calculated by calculating the average value of the pixel values of the corresponding pixels of the previous data and the current data. However, the pixel value at any time may be generated by calculating points of any ratio using a linear ratio.

"Process of Time Direction Interpolation Unit"

FIG. 13 is a flowchart illustrating an example of the process of the time direction interpolation units 251 and 252 according to the fourth embodiment of the present technology. The time direction interpolation units 251 and 252 repeat processes described below at each frame rate of the parallax image (L910).

First, a frame f_new (X, Y) of a new parallax image is acquired from the image memory 221 or 222 (step S911). Further, the frame stored in the frame buffer 254 is referred to as f_old (X, Y) (step S912). Then, the corresponding pixel search unit 255 searches for the corresponding pixels of both frames by comparing the frame f_new (X, Y) to the frame f_old (X, Y) of the parallax images (step S913).

The interpolation processing unit 256 generates the midpoint coordinates (u, v) of the moving vector connecting the searched corresponding pixels (step S914), and then calculates the pixel value s (u, v) from the average value of the pixel values of two corresponding pixels (step S915). Then, the interpolation processing unit 256 calculates the pixel value F (X, Y) through a linear interpolation method or the like (step S916). The pixel value F (X, Y) is output as a video at a middle time (step S917).

Then, before the process on the subsequent frame of the parallax image, the frame f_new (X, Y) of the parallax image is stored in the frame buffer 254 (step S918).

Thus, according to the fourth embodiment, the frame rate of the parallax image can be improved. Further, here, the parallax image is interpolated in the time direction in this embodiment, but the parallax detection image or the base image may be interpolated.

5. Fifth Embodiment

In a fifth embodiment, an image at the viewpoint of any position is generated by interpolating a parallax image in a space direction. Further, since the overall configuration of an imaging apparatus is the same as the configuration described with reference to FIG. 6, the description thereof will not be repeated.

"Configuration of Video Generation Unit"

FIG. 14 is a diagram illustrating an example of the configuration of a video generation unit 200 according to a fifth embodiment of the present technology. The video generation unit 200 according to the fifth embodiment is different from that according to the second embodiment in that a space direction interpolation unit 260 is connected to image memories 221 and 222. The space direction interpolation unit 260 interpolates video data of parallax images stored in the image memories 221 and 222 in a space direction.

"Configuration of Space Direction Interpolation Unit"

FIG. 15 is a diagram illustrating an example of the configuration of the space direction interpolation unit 260 according to the fifth embodiment of the present technology. The space direction interpolation unit 260 includes a corresponding pixel search unit 265 and an interpolation processing unit 266.

The corresponding pixel search unit 265 searches for the corresponding pixels of both frames of right and left images of the parallax images by comparing the frame of the left image of the parallax image to the frame of the right image of the parallax image. The corresponding pixel search unit 265 sets a search region in one of the right and left images and searches for the corresponding pixels using a partial region of the other image as a template. Since the same method as that of the above-described corresponding pixel search unit 245 can be used in this search process, the description thereof will not be repeated.

The interpolation processing unit 266 generates a pixel value at the viewpoint of any position through the interpolation based on information regarding the corresponding pixels searched for by the corresponding pixel search unit 265. Here, one of the images is referred to as first viewpoint data and the other of the images is referred to as second viewpoint data. First, a pixel value s (u, v) is calculated from the average value of the pixel values of two corresponding pixels at the midpoint coordinates (u, v) of a vector connecting the corresponding pixels of the first viewpoint data and the second viewpoint data to each other.

In this case, a u-v space is not necessarily identical to an X-Y space of the parallax image, as in the case of the fourth embodiment. Accordingly, a pixel value F (X, Y) of the X-Y space is generated from the pixel value s (u, v) of the entire region through an interpolation process. Since the details of the interpolation process are the same as those of the fourth embodiment, the detailed description thereof will not be repeated.

Here, the pixel value at the midpoint of the moving vector is calculated by calculating the average value of the pixel values of the corresponding pixels of the first viewpoint data and the second viewpoint data. However, the pixel value at the viewpoint of any position may be generated by calculating points of any ratio using a linear ratio.

"Process of Space Direction Interpolation Unit"

FIG. 16 is a flowchart illustrating an example of the processes of the space direction interpolation unit 260 according to the fifth embodiment of the present technology. The space direction interpolation unit 260 repeats processes described below at each frame rate of the parallax image (L920).

First, a frame f_left (X, Y) of a left image of new parallax images is acquired from the image memory 221 (step S921). Further, a frame f_right (X, Y) of a right image of the new parallax images is acquired from the image memory 222 (step S922). Then, the corresponding pixel search unit 265 searches for the corresponding pixels of both frames by comparing the frame f_left (X, Y) to the frame f_right (X, Y) of the parallax images (step S923).

The interpolation processing unit 266 generates the midpoint coordinates (u, v) of the vector connecting the corresponding pixels (step S924) searched for, and then calculates the pixel value s (u, v) from the average value of the pixel values of two corresponding pixels (step S925). Then, the interpolation processing unit 266 calculates the pixel value F (X, Y) through a linear interpolation method or the like (step S926). The pixel value F (X, Y) is output as a video at a middle time (step S927).

Thus, according to the fifth embodiment, the parallax image at the viewpoint of any position can be generated. Further, here, it is supposed that the corresponding pixels are searched for based on the right and left images of the parallax images. However, the corresponding pixels of both images may be searched for by comparing one of the right and left images of the parallax images to the base image.

6. Sixth Embodiment

"Configuration of Video Recording and Reproducing System"

FIG. 17 is a diagram illustrating an example of the configuration of a video recording and reproducing system according to a sixth embodiment. The video recording and reproducing system includes an imaging unit 100, a video generation unit 200, a video storage unit 300, a video reproduction unit 400, and a display unit 500. Since the imaging unit 100, the video generation unit 200, and the video storage unit 300 are similar to those described with reference to FIG. 6, the description thereof will not be repeated.

The video reproduction unit 400 reads video data stored in the video storage unit 300 and reproduces the video data. The video reproduction unit 400 includes decoding units 411 and 412 and display control units 421 and 422 in correspondence with the video data of the right and left parallax images. The decoding units 411 and 412 decode the video data of the parallax images read from the video storage unit 300. The display control units 421 and 422 perform controlling such that the display unit 500 displays the video data of the parallax images decoded by the decoding units 411 and 412.

The display unit 500 displays the video data of the parallax images output from the video reproduction unit 400. For example, the display unit 500 is considered to have a configuration in which circularly-polarized light or linearly-polarized light filters are mounted on two projectors, right-eye and left-eye parallax images are shown, respectively, and these images are viewed with circularly-polarized light or linearly-polarized light glasses corresponding to the display. Further, in a filter-attached flat panel display, right-eye and left-eye parallax images may be likewise shown at the same time and, for example, a stereoscopic display apparatus with a lenticular lens, a parallax barrier method or the like using no glasses may be used. Thus, in the embodiment of the present technology, visual fatigue is reduced by not showing right-eye and left-eye images alternately but showing right-eye and left-eye images simultaneously.

Further, in the embodiment of the present technology, blurring or jerkiness caused by movement are attempted to be resolved by performing the process from the generation of the video data by the imaging unit 100 to the display of the video data by the display unit 500 at a high frame rate. The blurring caused by movement frequently occurs by slip of a video on retinas when a moving subject is tracked and viewed particularly in hold-type display (tracking view) in addition to deterioration in MTF (Modulation Transfer Function) at the photographing. Here, the hold-type display means that a video continues to be displayed in a film, a liquid crystal projector, or the like during a frame period. Further, the jerkiness means that smoothness of a video is lost and a motion becomes unnatural. The jerkiness frequently occurs when a video photographed using a high-speed shutter is viewed with a fixed line of sight (fixed view). The deterioration in the quality of a moving image is related to the frame rate of photographing and displaying, an aperture ratio (aperture time/frame time) when photographing by a camera, visual sense characteristics, and the like.

Thus, according to the sixth embodiment of the present technology, the high-quality parallax image can be imaged and reproduced.

It should be noted that the above-described embodiments are merely examples used to embody the present technology, and the matters in the embodiments and matters specifying the invention in claims have correspondent relations. Likewise, the matters specifying the invention in claims and matters with the same names in the embodiments have correspondent relations. However, the present technology is not limited to the embodiments, but may be modified in various forms for the embodiments within the scope of the technology without departing from the gist of the technology. The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In this respect, it should be appreciated that one implementation of embodiments of the present invention comprises at least one computer-readable storage medium (i.e., a tangible, non-transitory computer-readable medium, such as a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs any of the above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

Embodiments of the present disclosure may take any of the following configurations:

1. An apparatus comprising:
a splitter configured to split light received from at least one subject into at least first and second components of light;
a first imaging element configured to convert the first component of light into a first electrical signal representing a base image of the at least one subject;
an optical arrangement configured to disperse the second component of light into at least a right component of light and a left component of light;
a second imaging element configured to convert the right component of light into a second electrical signal representing a right detection image of the at least one subject at a first angle; and a third imaging element configured to convert the left component of light into a third electrical signal representing a left detection image of the at least one subject at a second angle different from the first angle.

2. The apparatus of configuration 1, wherein the optical arrangement is a first optical arrangement and the light received from the at least one subject is parallel light, and wherein the apparatus further comprises a second optical arrangement configured to receive incident light from the at least one subject and convert the incident light into the parallel light.

3. The apparatus of configuration 2, wherein the second optical arrangement comprises a first lens unit configured to condense the incident light and a second lens unit configured to convert the condensed light into the parallel light.

4. The apparatus of configuration 1, wherein the splitter comprises at least one transmissive mirror.

5. The apparatus of configuration 4, wherein the at least one transmissive mirror is configured to reflect the first component of light and transmit the second component of light.

6. The apparatus of configuration 1, wherein the splitter is configured to split the received light into the first and second components of light such that each of the first and second components of light comprises about 50% of the received light.

7. The apparatus of configuration 6, wherein the optical arrangement is configured to disperse the second component of light into the right and left components of light such that each of the right and left components of light comprises about 25% of the received light.

8. The apparatus of configuration 1, wherein the splitter is configured to split the received light into the first and second components of light such that the first and second components of light comprise different percentages of the received light.

9. The apparatus of configuration 8, wherein the first component of light comprises about 60% of the received light and the second components of light comprises about 40% of the received light.

10. The apparatus of configuration 9, wherein the second optical arrangement is configured to disperse the second component of light into the right and left components of light such that each of the right and left components of light comprises about 20% of the received light.

11. The apparatus of configuration 1, wherein:
the first imaging element is configured to output the base image at a first resolution; and
the second imaging element is configured to output the right detection image at a second resolution lower than the first resolution.

12. The apparatus of configuration 1, wherein:
the base image comprises a series of base frames;
the right detection image comprises a series of right detection frames;
the first imaging element is configured to output the series of base frames at a first frame rate; and
the second imaging element is configured to output the series of right detection frames at a second frame rate higher than the first frame rate.

13. The apparatus of configuration 12, wherein the second frame rate is between 230 frames per second and 250 frames per second.

14. The apparatus of configuration 13, wherein the second frame rate is 240 frames per second.

15. The apparatus of configuration 12, wherein the second frame rate is between 290 frames per second and 310 frames per second.

16. The apparatus of configuration 15, wherein the second frame rate is 300 frames per second.

17. The apparatus of configuration 12, wherein the second frame rate is between 590 frames per second and 610 frames per second.

18. The apparatus of configuration 17, wherein the second frame rate is 600 frames per second.

19. An apparatus comprising:
means for splitting light received from at least one subject into at least first and second components of light;
means for converting the first component of light into a first electrical signal representing a base image of the at least one subject;
means for dispersing the second component of light into at least a right component of light and a left component of light;
means for converting the right component of light into a second electrical signal representing a right detection image of the at least one subject at a first angle; and
means for converting the left component of light into a third electrical signal representing a left detection image of the at least one subject at a second angle different from the first angle.

20. The apparatus of configuration 19, wherein the light received from the at least one subject is parallel light, and wherein the apparatus further comprises means for receiving incident light from the at least one subject and converting the incident light into the parallel light.

21. The apparatus of configuration 20, wherein the means for receiving and converting the incident light comprises means for condensing the incident light and means for converting the condensed light into the parallel light.

22. The apparatus of configuration 19, wherein the means for splitting the received light comprises means for reflecting a first portion of the received light and transmitting a second portion of the received light.

23. The apparatus of configuration 22, wherein means for splitting the received light is configured to reflect the first component of light and transmit the second component of light.

24. The apparatus of configuration 19, wherein the means for splitting the received light is configured to split the received light into the first and second components of light such that each of the first and second components of light comprises about 50% of the received light.

25. The apparatus of configuration 24, wherein the means for dispersing the second component of light is configured to disperse the second component of light into the right and left components of light such that each of the right and left components of light comprises about 25% of the received light.

26. The apparatus of configuration 19, wherein the means for splitting the received light is configured to split the received light into the first and second components of light such that the first and second components of light comprise different percentages of the received light.

27. The apparatus of configuration 26, wherein the first component of light comprises about 60% of the received light and the second components of light comprises about 40% of the received light.

28. The apparatus of configuration 27, wherein the means for dispersing the second component of light is configured to disperse the second component of light into the right and left components of light such that each of the right and left components of light comprises about 20% of the received light.

29. The apparatus of configuration 19, wherein:
the means for converting the first component of light into the first electrical signal is configured to output the base image at a first resolution; and
the means for converting the right component of light into the second electrical signal is configured to output the right detection image at a second resolution lower than the first resolution.

30. The apparatus of configuration 19, wherein:
the base image comprises a series of base frames;
the right detection image comprises a series of right detection frames;
the means for converting the first component of light into the first electrical signal is configured to output the series of base frames at a first frame rate; and
the means for converting the right component of light into the second electrical signal is configured to output the series of right detection frames at a second frame rate higher than the first frame rate.

31. The apparatus of configuration 30, wherein the second frame rate is between 230 frames per second and 250 frames per second.

32. The apparatus of configuration 31, wherein the second frame rate is 240 frames per second.

33. The apparatus of configuration 30, wherein the second frame rate is between 290 frames per second and 310 frames per second.

34. The apparatus of configuration 33, wherein the second frame rate is 300 frames per second.

35. The apparatus of configuration 30, wherein the second frame rate is between 590 frames per second and 610 frames per second.

36. The apparatus of configuration 35, wherein the second frame rate is 600 frames per second.

37. A method comprising:
splitting light received from at least one subject into at least first and second components of light;
converting the first component of light into a first electrical signal representing a base image of the at least one subject;
dispersing the second component of light into at least a right component of light and a left component of light;
converting the right component of light into a second electrical signal representing a right detection image of the at least one subject at a first angle; and
converting the left component of light into a third electrical signal representing a left detection image of the at least one subject at a second angle different from the first angle.

38. The method of configuration 37, wherein the light received from the at least one subject is parallel light, and wherein the method further comprises receiving incident light from the at least one subject and converting the incident light into the parallel light.

39. The method of configuration 38, wherein converting the incident light into the parallel light comprises condensing the incident light and converting the condensed light into the parallel light.

40. The method of configuration 37, wherein splitting the received light comprises using at least one transmissive mirror to split the received light.

41. The method of configuration 40, wherein splitting the received light comprises reflecting the first component of light and transmitting the second component of light.

42. The method of configuration 37, wherein splitting the received light comprises splitting the received light into the first and second components of light such that each of the first and second components of light comprises about 50% of the received light.

43. The method of configuration 6, wherein dispersing the second component of light comprises dispersing the second component of light into the right and left components of light such that each of the right and left components of light comprises about 25% of the received light.

44. The method of configuration 37, wherein splitting the received light comprises splitting the received light into the first and second components of light such that the first and second components of light comprise different percentages of the received light.

45. The method of configuration 44, wherein the first component of light comprises about 60% of the received light and the second components of light comprises about 40% of the received light.

46. The method of configuration 45, wherein dispersing the second component of light comprises dispersing the second component of light into the right and left components of light such that each of the right and left components of light comprises about 20% of the received light.

47. The method of configuration 37, wherein:
the base image is output at a first resolution; and
the right detection image is output at a second resolution lower than the first resolution.

48. The method of configuration 37, wherein:
the base image comprises a series of base frames;
the right detection image comprises a series of right detection frames;
the series of base frames is output at a first frame rate; and
the series of right detection frames is output at a second frame rate higher than the first frame rate.

49. The method of configuration 48, wherein the second frame rate is between 230 frames per second and 250 frames per second.

50. The method of configuration 49, wherein the second frame rate is 240 frames per second.

51. The method of configuration 48, wherein the second frame rate is between 290 frames per second and 310 frames per second.

52. The method of configuration 51, wherein the second frame rate is 300 frames per second.

53. The method of configuration 48, wherein the second frame rate is between 590 frames per second and 610 frames per second.

54. The method of configuration 53, wherein the second frame rate is 600 frames per second.

55. An apparatus comprising at least one processor programmed to:
use a right detection image to transform a base image captured from at least one subject into a right parallax image, the right detection image being captured from the at least one subject at a first angle; and
use a left detection image to transform the base image into a left parallax image, the left detection image being captured from the at least one subject at a second angle different from the first angle.

56. The apparatus of configuration 55, further comprising a display unit configured to display the right and left parallax images.

57. The apparatus of configuration 56, wherein:
the right parallax image comprises a series of right parallax frames; the left parallax image comprises a series of left parallax frames; and
the display unit is configured to simultaneously display each right parallax frame in the series of right parallax frames with a corresponding left parallax frame in the series of left parallax frames.

58. The apparatus of configuration 56, wherein:
the right parallax image comprises a series of right parallax frames; the left parallax image comprises a series of left parallax frames; and
the display unit is configured to alternately display the right and left parallax frames.
59. The apparatus of configuration 55, wherein the at least one processor is programmed to:
transform the base image into the right parallax image at least in part by moving at least one pixel of the base image based on a location of one or more corresponding pixels of the right detection image.
60. The apparatus of configuration 59, wherein the at least one processor is further programmed to:
search the right detection image to locate the one or more pixels of the right detection image corresponding to the at least one pixel of the base image.
61. The apparatus of configuration 59, wherein the at least one processor is programmed to:
transform the base image into the left parallax image at least in part by moving the at least one pixel of the base image based on a location of one or more corresponding pixels of the left detection image.
62. The apparatus of configuration 61, wherein the at least one processor is further programmed to:
search the right detection image to locate the one or more pixels of the right detection image corresponding to the at least one pixel of the base image; and search the left detection image to locate the one or more pixels of the left detection image corresponding to the at least one pixel of the base image.
63. The apparatus of configuration 55, wherein the at least one processor is further programmed to generate an interpolated image based on the right and left parallax images.
64. The apparatus of configuration 63, wherein the at least one processor is programmed to generate the interpolated image at least in part by:
searching the right detection image to locate one or more pixels of the right parallax image corresponding to one or more pixels of the left parallax image; and
using a location of the one or more corresponding pixels of the right parallax image and a location of the one or more corresponding pixels of the left parallax image to determine a location of one or more corresponding pixels of the interpolated image.
65. The apparatus of configuration 64, wherein the location of the one or more corresponding pixels of the interpolated image is a midpoint between the location of the one or more corresponding pixels of the right parallax image and the location of the one or more corresponding pixels of the left parallax image.
66. The apparatus of configuration 55, wherein:
the right parallax image comprises a series of right parallax frames; and
the at least one processor is further programmed to generate an interpolated frame based on first and second frames in the series of right parallax frames.
67. The apparatus of configuration 66, wherein the at least one processor is programmed to generate the interpolated frame at least in part by:
searching the first frame to locate one or more pixels of the first frame corresponding to one or more pixels of the second frame; and
using a location of the one or more corresponding pixels of the first frame and a location of the one or more corresponding pixels of the second frame to determine a location of one or more corresponding pixels of the interpolated frame.

68. The apparatus of configuration 67, wherein the location of the one or more corresponding pixels of the interpolated frame is a midpoint between the location of the one or more corresponding pixels of the first frame and the location of the one or more corresponding pixels of the second frame.
69. An apparatus comprising transforming means for:
using a right detection image to transform a base image captured from at least one subject into a right parallax image, the right detection image being captured from the at least one subject at a first angle; and
using a left detection image to transform the base image into a left parallax image, the left detection image being captured from the at least one subject at the second angle different from the first angle.
70. The apparatus of configuration 69, further comprising means for displaying the right and left parallax images.
71. The apparatus of configuration 70, wherein:
the right parallax image comprises a series of right parallax frames;
the left parallax image comprises a series of left parallax frames; and
the means for displaying is configured to simultaneously display each right parallax frame in the series of right parallax frames with a corresponding left parallax frame in the series of left parallax frames.
72. The apparatus of configuration 70, wherein:
the right parallax image comprises a series of right parallax frames;
the left parallax image comprises a series of left parallax frames; and
the means for displaying is configured to alternately display the right and left parallax frames.
73. The apparatus of configuration 69, wherein the transforming means is configured to:
transform the base image into the right parallax image at least in part by moving at least one pixel of the base image based on a location of one or more corresponding pixels of the right detection image.
74. The apparatus of configuration 73, wherein the transforming means is further configured to:
search the right detection image to locate the one or more pixels of the right detection image corresponding to the at least one pixel of the base image.
75. The apparatus of configuration 73, wherein the transforming means is configured to:
transform the base image into the left parallax image at least in part by moving the at least one pixel of the base image based on a location of one or more corresponding pixels of the left detection image.
76. The apparatus of configuration 75, wherein the transforming means is further configured to:
search the right detection image to locate the one or more pixels of the right detection image corresponding to the at least one pixel of the base image; and
search the left detection image to locate the one or more pixels of the left detection image corresponding to the at least one pixel of the base image.
77. The apparatus of configuration 69, wherein the transforming means is further configured to generate an interpolated image based on the right and left parallax images.
78. The apparatus of configuration 77, wherein the transforming means is configured to generate the interpolated image at least in part by:
searching the right detection image to locate one or more pixels of the right parallax image corresponding to one or more pixels of the left parallax image; and using a location of the one or more corresponding pixels of the right parallax image and a location of the one or more corresponding pixels of the left parallax image to determine a location of one or more corresponding pixels of the interpolated image.

79. The apparatus of configuration 78, wherein the location of the one or more corresponding pixels of the interpolated image is a midpoint between the location of the one or more corresponding pixels of the right parallax image and the location of the one or more corresponding pixels of the left parallax image.

80. The apparatus of configuration 69, wherein:
the right parallax image comprises a series of right parallax frames; and
the transforming means is further configured to generate an interpolated frame based on first and second frames in the series of right parallax frames.

81. The apparatus of configuration 80, wherein the transforming means is configured to generate the interpolated frame at least in part by:
searching the first frame to locate one or more pixels of the first frame corresponding to one or more pixels of the second frame; and
using a location of the one or more corresponding pixels of the first frame and a location of the one or more corresponding pixels of the second frame to determine a location of one or more corresponding pixels of the interpolated frame.

82. The apparatus of configuration 81, wherein the location of the one or more corresponding pixels of the interpolated frame is a midpoint between the location of the one or more corresponding pixels of the first frame and the location of the one or more corresponding pixels of the second frame.

83. A method comprising:
using a right detection image to transform a base image captured from at least one subject into a right parallax image, the right detection image being captured from the at least one subject at a first angle; and
using a left detection image to transform the base image into a left parallax image, the left detection image being captured from the at least one subject at a second angle different from the first angle.

84. The method of configuration 83, further comprising displaying the right and left parallax images.

85. The method of configuration 84, wherein:
the right parallax image comprises a series of right parallax frames;
the left parallax image comprises a series of left parallax frames; and
displaying the right and left parallax images comprises simultaneously displaying each right parallax frame in the series of right parallax frames with a corresponding left parallax frame in the series of left parallax frames.

86. The method of configuration 84, wherein:
the right parallax image comprises a series of right parallax frames;
the left parallax image comprises a series of left parallax frames; and
displaying the right and left parallax images comprises alternately displaying the right and left parallax frames.

87. The method of configuration 83, wherein transforming the base image into the right parallax image comprises moving at least one pixel of the base image based on a location of one or more corresponding pixels of the right detection image.

88. The method of configuration 87, further comprising:
searching the right detection image to locate the one or more pixels of the right detection image corresponding to the at least one pixel of the base image.

89. The method of configuration 87, wherein transforming the base image into the left parallax image comprises moving the at least one pixel of the base image based on a location of one or more corresponding pixels of the left detection image.

90. The method of configuration 89, further comprising:
searching the right detection image to locate the one or more pixels of the right detection image corresponding to the at least one pixel of the base image; and
searching the left detection image to locate the one or more pixels of the left detection image corresponding to the at least one pixel of the base image.

91. The method of configuration 83, further comprising generating an interpolated image based on the right and left parallax images.

92. The method of configuration 91, wherein generating the interpolated image comprises:
searching the right detection image to locate one or more pixels of the right parallax image corresponding to one or more pixels of the left parallax image; and
using a location of the one or more corresponding pixels of the right parallax image and a location of the one or more corresponding pixels of the left parallax image to determine a location of one or more corresponding pixels of the interpolated image.

93. The method of configuration 92, wherein the location of the one or more corresponding pixels of the interpolated image is a midpoint between the location of the one or more corresponding pixels of the right parallax image and the location of the one or more corresponding pixels of the left parallax image.

94. The method of configuration 83, wherein:
the right parallax image comprises a series of right parallax frames; and
the method further comprises generating an interpolated frame based on first and second frames in the series of right parallax frames.

95. The method of configuration 94, wherein generating the interpolated frame comprises:
searching the first frame to locate one or more pixels of the first frame corresponding to one or more pixels of the second frame; and
using a location of the one or more corresponding pixels of the first frame and a location of the one or more corresponding pixels of the second frame to determine a location of one or more corresponding pixels of the interpolated frame.

96. The method of configuration 95, wherein the location of the one or more corresponding pixels of the interpolated frame is a midpoint between the location of the one or more corresponding pixels of the first frame and the location of the one or more corresponding pixels of the second frame.

97. At least one computer-readable storage medium encoded with instructions that, when executed by at least one processor, perform a method comprising acts of:
using a right detection image to transform a base image captured from at least one subject into a right parallax image, the right detection image being captured from the at least one subject at a first angle; and
using a left detection image to transform the base image into a left parallax image, the left detection image being captured from the at least one subject at a second angle different from the first angle.

98. The at least one computer-readable storage medium of configuration 97, wherein the method further comprises displaying the right and left parallax images.

99. The at least one computer-readable storage medium of configuration 98, wherein:
the right parallax image comprises a series of right parallax frames; the left parallax image comprises a series of left parallax frames; and displaying the right and left parallax images comprises simultaneously displaying each right parallax frame in the series of right parallax frames with a corresponding left parallax frame in the series of left parallax frames.

100. The at least one computer-readable storage medium of configuration 98, wherein:
the right parallax image comprises a series of right parallax frames;
the left parallax image comprises a series of left parallax frames; and
displaying the right and left parallax images comprises alternately displaying the right and left parallax frames.

101. The at least one computer-readable storage medium of configuration 97, wherein transforming the base image into the right parallax image comprises moving at least one pixel of the base image based on a location of one or more corresponding pixels of the right detection image.

102. The at least one computer-readable storage medium of configuration 101, wherein the method further comprises:
searching the right detection image to locate the one or more pixels of the right detection image corresponding to the at least one pixel of the base image.

103. The at least one computer-readable storage medium of configuration 101, wherein transforming the base image into the left parallax image comprises moving the at least one pixel of the base image based on a location of one or more corresponding pixels of the left detection image.

104. The at least one computer-readable storage medium of configuration 103, wherein the method further comprises:
searching the right detection image to locate the one or more pixels of the right detection image corresponding to the at least one pixel of the base image; and
searching the left detection image to locate the one or more pixels of the left detection image corresponding to the at least one pixel of the base image.

105. The at least one computer-readable storage medium of configuration 97, wherein the method further comprises generating an interpolated image based on the right and left parallax images.

106. The at least one computer-readable storage medium of configuration 105, wherein generating the interpolated image comprises:
searching the right detection image to locate one or more pixels of the right parallax image corresponding to one or more pixels of the left parallax image; and
using a location of the one or more corresponding pixels of the right parallax image and a location of the one or more corresponding pixels of the left parallax image to determine a location of one or more corresponding pixels of the interpolated image.

107. The at least one computer-readable storage medium of configuration 106, wherein the location of the one or more corresponding pixels of the interpolated image is a midpoint between the location of the one or more corresponding pixels of the right parallax image and the location of the one or more corresponding pixels of the left parallax image.

108. The at least one computer-readable storage medium of configuration 97, wherein:
the right parallax image comprises a series of right parallax frames; and
the method further comprises generating an interpolated frame based on first and second frames in the series of right parallax frames.

109. The at least one computer-readable storage medium of configuration 108, wherein
generating the interpolated frame comprises:
searching the first frame to locate one or more pixels of the first frame corresponding to one or more pixels of the second frame; and
using a location of the one or more corresponding pixels of the first frame and a location of the one or more corresponding pixels of the second frame to determine a location of one or more corresponding pixels of the interpolated frame.

110. The at least one computer-readable storage medium of configuration 109, wherein the location of the one or more corresponding pixels of the interpolated frame is a midpoint between the location of the one or more corresponding pixels of the first frame and the location of the one or more corresponding pixels of the second frame.

111. An imaging system comprising:
a splitter configured to split light received from at least one subject into at least first and second components of light;
a first imaging element configured to convert the first component of light into a first electrical signal representing a base image of the at least one subject;
an optical arrangement configured to disperse the second component of light into at least a right component of light and a left component of light;
a second imaging element configured to convert the right component of light into a second electrical signal representing a right detection image of the at least one object at a first angle;
a third imaging element configured to convert the left component of light into a third electrical signal representing a left detection image of the at least one subject at a second angle different from the first angle; and
at least one processor programmed to:
use the right detection image to transform the base image into a right parallax image; and
use the left detection image to transform the base image into a left parallax image. Embodiments of the present disclosure may also take any of the following additional configurations:
"Additional configuration 1"
An imaging apparatus comprising:
a photographing lens that condenses light from a subject;
a relay lens that transmits the condensed light to turn the condensed light into parallel light;
a semi-transmissive film that transmits and reflects the parallel light;
a mirror that disperses the light guided by the transmission or reflection by the semi-transmissive film into right light beams and left light beams;
first and second image forming lenses that form images of the dispersed light, respectively;
first and second imaging elements that convert the images of the light formed by the first and second image forming lenses into parallax detection images formed by electric signals, respectively;
a third image forming lens that forms an image of light transmitted or reflected by the semi-transmissive film and not guided to the mirror; and
a third imaging element that converts the image of the light formed by the third image forming lens into a base image formed by an electric signal.
"Additional configuration 2"
The imaging apparatus according to additional configuration 1, further comprising:

a parallax image generation unit that generates a parallax image having the same viewpoint as each of the parallax detection images based on the base image by comparing the base image to each of the parallax detection images.

"Additional configuration 3"

The imaging apparatus according to additional configuration 2, wherein the parallax image generation unit includes
a corresponding pixel search unit that searches for pixels corresponding to each other by comparing the base image to each of the parallax detection images, and
a pixel movement unit that generates the parallax image by moving pixels of the base image to positions of the corresponding pixels of the parallax detection image based on the search result.

"Additional configuration 4"

The imaging apparatus according to additional configuration 2, further comprising:
a time direction interpolation unit that interpolates an image at any time by comparing two frames at different times in video data which includes the base image or the parallax detection image as a time-series frame to search for pixels corresponding to each other and calculating midpoint coordinates and pixel values of the corresponding pixels based on the search result.

"Additional configuration 5"

The imaging apparatus according to additional configuration 2, further comprising: a space direction interpolation unit that interpolates an image at any viewpoint by comparing two images among the base image and the parallax detection images to search for pixels corresponding to each other and calculating midpoint coordinates and pixel values of the corresponding pixels based on the search result.

"Additional configuration 6"

The imaging apparatus according to additional configuration 1, wherein each of the first to third imaging elements generates the base image or the parallax detection image at a rate equal to or greater than 60 frames per second.

"Additional configuration 7"

The imaging apparatus according to additional configuration 6, wherein each of the first and second imaging elements generates the parallax detection image at a rate of 230 frames to 250 frames per second.

"Additional configuration 8"

The imaging apparatus according to additional configuration 6, wherein each of the first and second imaging elements generates the parallax detection image at a rate of 290 frames to 310 frames per second.

"Additional configuration 9"

The imaging apparatus according to additional configuration 6, wherein each of the first and second imaging elements generates the parallax detection image at a rate of 590 frames to 610 frames per second.

"Additional configuration 10"

A video recording and reproducing system comprising:
a photographing lens that condenses light from a subject;
a relay lens that transmits the condensed light to turn the condensed light into parallel light;
a semi-transmissive film that transmits and reflects the parallel light;
a mirror that disperses the light guided by the transmission or reflection by the semi-transmissive film into right light beams and left light beams;
first and second image forming lenses that form images of the dispersed light, respectively;
first and second imaging elements that convert the images of the light formed by the first and second image forming lenses into parallax detection images formed by electric signals, respectively;
a third image forming lens that forms an image of light transmitted or reflected by the semi-transmissive film and not guided to the mirror;
a third imaging element that converts the image of the light formed by the third image forming lens into a base image formed by an electric signal;
a parallax image generation unit that generates a parallax image having the same viewpoint as each of the parallax detection images based on the base image by comparing the base image to each of the parallax detection images;
a video generation unit that generates the parallax images as frames of right and left video data and records the right and left video data in a storage unit; and
a video reproducing unit that simultaneously reproduces and displays the right and left video data recorded in the storage unit.

The phraseology and terminology used herein is for the purpose of description and should not be regarded as limiting. The use of "including," "comprising," "having," "containing", "involving", and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements from each other. Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

REFERENCE SIGNS LIST

100 IMAGING UNIT
110 EXCHANGE LENS
115 PUPIL
120 LENS MOUNT
130 RELAY LENS UNIT
140 PARALLEL LIGHT REGION
141 TRANSMISSIVE MIRROR
142 to 146 MIRROR
151 to 153 CONDENSER LENS
171 to 173 IMAGING ELEMENT
200 VIDEO GENERATION UNIT
211 to 213 SIGNAL PROCESSING UNIT
221, 222 IMAGE MEMORY
231, 232 ENCODING UNIT
241, 242 PARALLAX IMAGE GENERATION UNIT
245, 255, 26 CORRESPONDING PIXEL SEARCH UNIT
246 PIXEL MOVEMENT UNIT
251 TIME DIRECTION INTERPOLATION UNIT
254 FRAME BUFFER
256, 266 INTERPOLATION PROCESSING UNIT
260 SPACE DIRECTION INTERPOLATION UNIT
300 VIDEO STORAGE UNIT

400 VIDEO REPRODUCING UNIT
411, 412 DECODING UNIT
421, 422 DISPLAY CONTROL UNIT
500 DISPLAY UNIT

The invention claimed is:

1. An apparatus, comprising:
a splitter configured to split light in a parallel light region into at least a first component of light and a second component of light, wherein the light is received by the apparatus from at least one subject;
a first imaging element configured to convert the first component of light into a first electrical signal representing a base image of the at least one subject;
an optical arrangement configured to disperse the second component of light into at least a right component of light and a left component of light;
a second imaging element configured to convert the right component of light into a second electrical signal representing a right detection image of the at least one subject at a first angle;
a third imaging element configured to convert the left component of light into a third electrical signal representing a left detection image of the at least one subject at a second angle different from the first angle; and
a circuitry configured to:
generate a first parallax image based on the right detection image and the left detection image; and
generate a second parallax image based on the first parallax image and the base image, wherein an image quality of the second parallax image is higher than an image quality of the first parallax image.

2. The apparatus of claim 1, wherein the splitter comprises at least one transmissive mirror.

3. The apparatus of claim 2, wherein the at least one transmissive mirror is configured to reflect the first component of light and transmit the second component of light.

4. The apparatus of claim 1, wherein the splitter is further configured to split the received light into the first component of light and the second component of light such that each of the first component of light and the second component of light comprises about 50% of the received light.

5. The apparatus of claim 4, wherein the optical arrangement is further configured to disperse the second component of light into the right component of light and the left component of light such that each of the right component of light and the left component of light comprises about 25% of the received light.

6. The apparatus of claim 1, wherein the splitter is further configured to split the received light into the first component of light and the second component of light such that the first component of light and the second component of light comprise different percentages of the received light.

7. The apparatus of claim 6, wherein the first component of light comprises about 60% of the received light and the second component of light comprises about 40% of the received light.

8. The apparatus of claim 7, wherein the optical arrangement is further configured to disperse the second component of light into the right component of light and the left component of light such that each of the right component of light and the left component of light comprises about 20% of the received light.

9. The apparatus of claim 1, wherein:
the first imaging element is further configured to output the base image at a first resolution; and
the second imaging element is further configured to output the right detection image at a second resolution lower than the first resolution.

10. The apparatus of claim 1, wherein the second parallax image is based on parallax information of the second electrical signal and the third electrical signal, and image quality information of the first electrical signal.

11. The apparatus of claim 10, wherein the image quality information of the first electrical signal comprises at least one of brightness or resolution.

12. The apparatus of claim 1, wherein the first electrical signal is 4K resolution image, and the second electrical signal and the third electrical signal are 2K resolution images.

13. A method, comprising:
splitting, by a splitter, light in a parallel light region into at least a first component of light and a second component of light, wherein the light is received from at least one subject;
converting, by a first imaging element, the first component of light into a first electrical signal representing a base image of the at least one subject;
dispersing, by an optical arrangement, the second component of light into at least a right component of light and a left component of light;
converting, by a second imaging element, the right component of light into a second electrical signal representing a right detection image of the at least one subject at a first angle;
converting, by a third imaging element, the left component of light into a third electrical signal representing a left detection image of the at least one subject at a second angle different from the first angle;
generating, by a circuitry, a first parallax image based on the right detection image and the left detection image; and
generating, by the circuitry, a second parallax image based on the first parallax image and the base image, wherein an image quality of the second parallax image is higher than an image quality of the first parallax image.

* * * * *